(12) United States Patent
Sealey, II et al.

(10) Patent No.: US 12,534,854 B2
(45) Date of Patent: Jan. 27, 2026

(54) WET LAID PAPER AND PAPERBOARD PRODUCTS WITH HIGH WET STRENGTH AND METHOD OF MAKING THE SAME

(71) Applicant: First Quality Tissue, LLC, Great Neck, NY (US)

(72) Inventors: James E. Sealey, II, Belton, SC (US); Kevin P. Brennan, Anderson, SC (US); Justin S. Pence, Anderson, SC (US); Richard James Riehle, Wilmington, DE (US); Daniel Mark Henn, Wilmington, DE (US)

(73) Assignee: FIRST QUALITY TISSUE, LLC, Great Neck, NY (US)

( * ) Notice: Subject to any disclaimer, the term of this patent is extended or adjusted under 35 U.S.C. 154(b) by 28 days.

(21) Appl. No.: 18/335,331

(22) Filed: Jun. 15, 2023

(65) Prior Publication Data

US 2024/0218603 A1 Jul. 4, 2024

Related U.S. Application Data

(60) Provisional application No. 63/354,512, filed on Jun. 22, 2022, provisional application No. 63/353,243, (Continued)

(51) Int. Cl.
*D21H 21/20* (2006.01)
*D21H 17/00* (2006.01)
(Continued)

(52) U.S. Cl.
CPC .............. *D21H 21/20* (2013.01); *D21H 17/11* (2013.01); *D21H 17/43* (2013.01);
(Continued)

(58) Field of Classification Search
CPC ........ D21H 21/20; D21H 17/11; D21H 17/43; D21H 17/455; D21H 17/55; D21H 17/72;
(Continued)

(56) References Cited

U.S. PATENT DOCUMENTS 2,926,154 A 2/1960 Keim
3,049,469 A 8/1962 Davison
(Continued)

FOREIGN PATENT DOCUMENTS

CA 3122653 C * 7/2023 .............. D21F 11/12
CN 102665510 A 9/2012
(Continued)

OTHER PUBLICATIONS

Huang et al. "The role of polyaminoamide-epichlorohydrin (PAE) on antibody longevity in bioactive paper" Colloids and Surfaces B: Biointerfaces, vol. 158 (Oct. 1, 2017): pp. 197-202; abstract, p. 198 col 1 para 4, p. 201 col 2 para 1, fig. 4.
(Continued)

*Primary Examiner* — Jose A Fortuna
(74) *Attorney, Agent, or Firm* — Amster Rothstein & Ebenstein LLP

(57) ABSTRACT

A method of making paper and paperboard products, including absorbent structures, where the method includes mixing ultra-high molecular weight ("UHMW") glyoxalated polyvinylamide ("GPVM") adducts and high molecular weight ("HMW") anionic polyacrylamide ("APAM") with the furnish during stock preparation of a wet laid papermaking process.

17 Claims, 6 Drawing Sheets

Related U.S. Application Data filed on Jun. 17, 2022, provisional application No. 63/352,903, filed on Jun. 16, 2022.

(51) Int. Cl.
*D21H 17/11* (2006.01)
*D21H 17/43* (2006.01)
*D21H 17/45* (2006.01)
*D21H 17/55* (2006.01)

(52) U.S. Cl.
CPC ........... *D21H 17/455* (2013.01); *D21H 17/55* (2013.01); *D21H 17/72* (2013.01)

(58) Field of Classification Search
CPC ........ D21H 11/12; D21H 11/14; D21H 17/07; D21H 17/36; D21H 17/375; D21H 17/56; D21H 21/18; D21H 21/22; D21H 27/002; D21H 27/005; D21H 27/30; A47K 10/16
See application file for complete search history.

(56) References Cited

U.S. PATENT DOCUMENTS

| | | |
|---|---|---|
| 3,058,873 A | 10/1962 | Keim et al. |
| 3,066,066 A | 11/1962 | Keim et al. |
| 3,125,552 A | 3/1964 | Loshaek et al. |
| 3,186,900 A | 6/1965 | De Young |
| 3,197,427 A | 7/1965 | Schmalz |
| 3,224,986 A | 12/1965 | Butler et al. |
| 3,224,990 A | 12/1965 | Babcock |
| 3,227,615 A | 1/1966 | Korden |
| 3,227,671 A | 1/1966 | Keim |
| 3,239,491 A | 3/1966 | Tsou et al. |
| 3,240,664 A | 3/1966 | Earle, Jr. |
| 3,240,761 A | 3/1966 | Keim et al. |
| 3,248,280 A | 4/1966 | Hyland, Jr. |
| 3,250,664 A | 5/1966 | Conte et al. |
| 3,311,594 A | 3/1967 | Earle, Jr. |
| 3,329,657 A | 7/1967 | Strazdins et al. |
| 3,332,834 A | 7/1967 | Reynolds, Jr. |
| 3,332,901 A | 7/1967 | Keim |
| 3,352,833 A | 11/1967 | Earle, Jr. |
| 3,414,459 A | 12/1968 | Wells |
| 3,442,754 A | 5/1969 | Espy |
| 3,459,697 A | 8/1969 | Goldberg et al. |
| 3,483,077 A | 12/1969 | Aldrich |
| 3,556,907 A | 1/1971 | Nystrand |
| 3,609,126 A | 9/1971 | Asao et al. |
| 3,733,290 A | 5/1973 | Williams et al. |
| 3,778,339 A | 12/1973 | Williams et al. |
| 3,813,362 A | 5/1974 | Coscia et al. |
| 3,855,158 A | 12/1974 | Petrovich et al. |
| 3,877,510 A | 4/1975 | Tegtmeier et al. |
| 3,911,173 A | 10/1975 | Sprague, Jr. |
| 3,994,771 A | 11/1976 | Morgan, Jr. et al. |
| 3,998,690 A | 12/1976 | Lyness et al. |
| 4,098,632 A | 7/1978 | Sprague, Jr. |
| 4,102,737 A | 7/1978 | Morton |
| 4,129,528 A | 12/1978 | Petrovich et al. |
| 4,147,586 A | 4/1979 | Petrovich et al. |
| 4,191,609 A | 3/1980 | Trokhan |
| 4,501,862 A | 2/1985 | Keim |
| 4,515,657 A | 5/1985 | Maslanka |
| 4,529,480 A | 7/1985 | Trokhan |
| 4,537,657 A | 8/1985 | Keim |
| 4,714,736 A | 12/1987 | Juhl et al. |
| 4,770,920 A | 9/1988 | Larsonneur |
| 4,885,202 A | 12/1989 | Lloyd et al. |
| 4,891,249 A | 1/1990 | McIntyre |
| 4,949,688 A | 8/1990 | Bayless |
| 4,996,091 A | 2/1991 | McIntyre |
| 5,017,642 A | 5/1991 | Hasegawa et al. |
| 5,143,776 A | 9/1992 | Givens |
| 5,171,795 A | 12/1992 | Miller et al. |
| 5,239,047 A | 8/1993 | Devore et al. |
| 5,470,742 A | 11/1995 | Bull et al. |
| 5,510,002 A | 4/1996 | Hermans et al. |
| 5,516,885 A | 5/1996 | Gorzynski et al. |
| 5,607,551 A | 3/1997 | Farrington, Jr. et al. |
| 5,714,552 A | 2/1998 | Bower |
| 5,843,763 A | 12/1998 | Bull et al. |
| 5,871,616 A | 2/1999 | Bull et al. |
| 6,056,855 A | 5/2000 | Amey |
| 6,057,420 A | 5/2000 | Amey |
| 6,342,580 B1 | 1/2002 | Laurent et al. |
| 6,376,578 B1 | 4/2002 | Gorzynski et al. |
| 6,429,267 B1 | 8/2002 | Riehle |
| 6,554,961 B1 | 4/2003 | Riehle et al. |
| 6,821,391 B2 | 11/2004 | Scherb et al. |
| 6,908,983 B2 | 6/2005 | Maslanka |
| 7,081,512 B2 | 7/2006 | Riehle |
| 7,175,740 B2 | 2/2007 | Riehle et al. |
| 7,303,652 B2 | 12/2007 | Riehle et al. |
| 7,339,378 B2 | 3/2008 | Han et al. |
| 7,351,307 B2 | 4/2008 | Scherb et al. |
| 7,387,706 B2 | 6/2008 | Herman et al. |
| 7,442,278 B2 | 10/2008 | Murray et al. |
| 7,476,293 B2 | 1/2009 | Herman et al. |
| 7,494,563 B2 | 2/2009 | Edwards et al. |
| 7,510,631 B2 | 3/2009 | Scherb et al. |
| 7,582,187 B2 | 9/2009 | Scherb et al. |
| 7,686,923 B2 | 3/2010 | Scherb et al. |
| 7,691,230 B2 | 4/2010 | Scherb et al. |
| 7,744,726 B2 | 6/2010 | Scherb et al. |
| 7,811,418 B2 | 10/2010 | Klerelid et al. |
| 7,887,673 B2 | 2/2011 | Andersson et al. |
| 7,905,989 B2 | 3/2011 | Scherb et al. |
| 7,931,781 B2 | 4/2011 | Scherb et al. |
| 7,932,349 B2 | 4/2011 | Riehle et al. |
| 7,951,269 B2 | 5/2011 | Herman et al. |
| 8,075,739 B2 | 12/2011 | Scherb et al. |
| 8,080,130 B2 | 12/2011 | Harper et al. |
| 8,092,652 B2 | 1/2012 | Scherb et al. |
| 8,101,710 B2 | 1/2012 | Riehle et al. |
| 8,118,979 B2 | 2/2012 | Herman et al. |
| 8,196,314 B2 | 6/2012 | Munch |
| 8,366,880 B2 | 2/2013 | Toubeau et al. |
| 8,382,956 B2 | 2/2013 | Boechat et al. |
| 8,402,673 B2 | 3/2013 | Da Silva et al. |
| 8,435,384 B2 | 5/2013 | Da Silva et al. |
| 8,440,055 B2 | 5/2013 | Scherb et al. |
| 8,544,184 B2 | 10/2013 | Da Silva et al. |
| 8,580,083 B2 | 11/2013 | Boechat et al. |
| 9,655,490 B2 | 5/2017 | Sumnicht et al. |
| 9,661,974 B2 | 5/2017 | Baker et al. |
| 9,719,212 B2 | 8/2017 | Crisp et al. |
| 9,783,933 B2 | 10/2017 | Borkar et al. |
| 9,879,380 B2 | 1/2018 | Borkar et al. |
| 9,885,155 B2 | 2/2018 | Borkar et al. |
| 10,045,677 B2 | 8/2018 | Baker et al. |
| 10,337,147 B2 | 7/2019 | Rouse et al. |
| 10,544,547 B2 | 1/2020 | Sealey et al. |
| 10,704,203 B2 | 7/2020 | Chou et al. |
| 10,883,228 B2 | 1/2021 | Bradbury et al. |
| 10,982,392 B2 | 4/2021 | Sealey et al. |
| 2003/0000667 A1 | 1/2003 | Riehle et al. |
| 2008/0156450 A1 | 7/2008 | Klerelid et al. |
| 2009/0117331 A1 | 5/2009 | Fung et al. |
| 2009/0194244 A1 | 8/2009 | Harper et al. |
| 2010/0065234 A1 | 3/2010 | Klerelid et al. |
| 2011/0180223 A1 | 7/2011 | Klerelid et al. |
| 2012/0111519 A1 | 5/2012 | Toubeau et al. |
| 2013/0081771 A1 | 4/2013 | Luo et al. |
| 2015/0129146 A1 | 5/2015 | Chou et al. |
| 2015/0238650 A1 | 8/2015 | Lu et al. |
| 2016/0047090 A1 | 2/2016 | Crisp et al. |
| 2016/0265163 A1 | 9/2016 | Hagiopol et al. |
| 2016/0298297 A1 | 10/2016 | Borkar et al. |
| 2017/0101741 A1 | 4/2017 | Sealey et al. |
| 2017/0233949 A1 | 8/2017 | Borkar et al. |
| 2017/0254023 A1 | 9/2017 | Sumnicht et al. |
| 2017/0260696 A1 | 9/2017 | Chou et al. |
| 2017/0303762 A1 | 10/2017 | Baker et al. |

(56) References Cited

U.S. PATENT DOCUMENTS

| | | | |
|---|---|---|---|
| 2018/0051416 A1 | 2/2018 | Lu et al. | |
| 2018/0142419 A1 | 5/2018 | Rouse et al. | |
| 2018/0320318 A1 | 11/2018 | Qin et al. | |
| 2018/0344120 A1 | 12/2018 | Baker et al. | |
| 2019/0316298 A1 | 10/2019 | Miller et al. | |
| 2020/0131709 A1 | 4/2020 | Mitchell et al. | |
| 2020/0347556 A1 | 11/2020 | Sealey, II et al. | |
| 2021/0054548 A1 | 2/2021 | Salam et al. | |
| 2021/0164166 A1 | 6/2021 | Sealey et al. | |
| 2021/0285159 A1 | 9/2021 | Burazin et al. | |
| 2022/0192438 A1 | 6/2022 | Sealey, II et al. | |
| 2022/0316142 A1 | 10/2022 | Ramaratnam et al. | |
| 2023/0407575 A1* | 12/2023 | Sealey, II | D21H 17/42 |
| 2024/0023765 A1* | 1/2024 | Sealey, II | D21H 21/20 |
| 2024/0218603 A1* | 7/2024 | Sealey, II | D21H 17/11 |

FOREIGN PATENT DOCUMENTS

| | | | | |
|---|---|---|---|---|
| CN | 105899729 A | | 8/2016 | |
| CN | 120187921 A | * | 6/2025 | ............ D21H 17/72 |
| EP | 0696334 B1 | | 3/1999 | |
| JP | 4903196 B2 | | 3/2012 | |
| KR | 20250053045 A | * | 4/2025 | ............ D21H 21/18 |
| RU | 2025100548 A | * | 2/2025 | ............ D21H 11/12 |
| WO | 2006111612 A1 | | 10/2006 | |
| WO | 2009061079 A1 | | 5/2009 | |
| WO | 2020205907 A1 | | 10/2020 | |
| WO | 2022133257 A1 | | 6/2022 | |

OTHER PUBLICATIONS

"Morris, H. ""Utilising novel temporary wet strength for the AfH towel market. A TW report"" Technical report (online). Tissue World Magazine. Sep. 25, 2014; Retrieved from the Internet on Oct. 10, 2023: <URL:https://www. tissueworldmagazine.com/technical-theme/utilising-novel-temporary-wet-strength-for-the-afh-towel-market-a-tw-report/>; pp. 2-3".

Crisp, Mark T. and Riehle, Richard J, Regulatory and sustainability initiatives lead to improved polyaminopolyamide-epichlorohydrin (PAE) wet-strength resins and paper products, TAPPI Journal, vol. 17, No. 9, Sep. 2018.

Ntifafa, Yet al "An analytical method to quantitatively determine the amount of polyamide epichlorohydrin (PAE) in paperboard and white water" TAPP! Journal. vol. ~2. No. 2. Feb. 2023; abstract; pp. 140-141; DOI: 10.32964/TJ22.2.138.

Lee et al., A simultaneous derivatization of 3-monochloropropanediol and 1,3-dichloropropane with hexamethyldisilazane-trimethylsilyl trifluoromethanesulfonate at room temperature for efficient analysis of food sample analysis, Journal of Chromatography A, vol. 1432, Jan. 4, 2016 [retrieved Oct. 9, 2023]. Retrieved from the internet: <URL: https://papers.ssrn.com/sol3/papers.cfm?abstract_id=2719996>, entire document.

International Search Report and Written Opinion issued in Application No. PCT/US2021/064104, dated May 16, 2022.

International Search Report and Written Opinion issued in Application No. PCT/US2022/033821, dated Sep. 7, 2022.

International Search Report and Written Opinion issued in Application No. PCT/US2023/068500, dated Nov. 8, 2023.

International Search Report and Written Opinion issued in Application No. PCT/US2023/068477, dated Nov. 14, 2023.

International Search Report and Written Opinion issued in Application No. PCT/US2023/029212, dated Nov. 8, 2023.

Petty II, A.J., Wright, M. and Borkar, S., TAPPI Journal, Next generation dry strength additives: Leveraging on-site synthesis to develop high performance glyoxalated polyacrylamides (Jan. 2024).

International Search Report issued in Application No. PCT/US2023/068477, mailed Nov. 14, 2023.

Crisp, MT et al. "Regulatory and Sustainability Initiatives Lead to Improved Polyaminoamide-epihalohydrin (PAE) Wet Strength Resins and Paper Products" TAPP! Conference and Expo. 2017; Retrieved from the Internet on Oct. 16, 2023: URL: https://www.tappi.org/content/Events/Tissue%202017/Conference%20Proceedings/REV_3B.3_Riehl.M.pdf; pp. 4-5.

Ntifafa, Yet al. "An analytical method to quantitatively determine the amount of polyamide epichlorohydrin (PAE) in paperboard and white waler" TAPP! Journal. vol. 22, No. 2. Feb. 2023; abstract; pp. 140-141; DOI: 10.32964/TJ22.2.138.

Chinese Office Action issued in Application No. 202180091306.0, dated Jan. 24, 2025.

International Search Report issued in Application No. PCT/US2023/029212, mailed Nov. 8, 2024.

Written Opinion issued in Application No. PCT/US2023/029212, mailed Nov. 8, 2024.

* cited by examiner

| Commercial Sample | 1,3-DCP (µg/l) | 3-MCPD (µg/l) | 1,3-DCP (ppb) | 3-MCPD (ppb) | PAE % Weight % |
|---|---|---|---|---|---|
| A- TAD towel Walgreens Oct 2020 | <2 | 110 | <2 | 2750 | 0.201 |
| B- Conventional Towel Walmart September 2020 | <2 | 180 | <2 | 4500 | NT |
| C- TAD towel Target October 2020 | <2 | 130 | <2 | 3250 | NT |
| D- TAD towel Walmart October 2020 | <2 | 86 | <2 | 2150 | 0.138 |
| E- TAD towel Costco September 2020 | <2 | 110 | <2 | 2750 | 0.176 |
| F-TAD towel Sam's September 2020 | <2 | 80 | <2 | 2000 | NT |
| G- TAD Towel Meijer October 2020 | <2 | 64 | <2 | 1600 | NT |
| H- TAD towel Winco August 2020 | <2 | 75 | <2 | 1875 | NT |
| I- TAD towel Simply Done September 2020 | <2 | 120 | <2 | 3000 | NT |
| K- TAD towel Sam's September 2020 | <2 | 100 | <2 | 2500 | NT |

NT = not tested

Table 1: Commercial retail towels samples

FIG. 9

WET LAID PAPER AND PAPERBOARD PRODUCTS WITH HIGH WET STRENGTH AND METHOD OF MAKING THE SAME

RELATED APPLICATIONS

This application claims priority to and the benefit of U.S. Provisional Patent Application No. 63/352,903, filed Jun. 16, 2022, U.S. Provisional Patent Application No. 63/353,243, filed Jun. 17, 2022, and U.S. Provisional Patent Application No. 63/354,512, filed Jun. 22, 2023, the contents of which are incorporated herein by reference in their entirety.

FIELD OF THE INVENTION

The present invention relates to a method of producing wet laid paper and paperboard products (e.g., disposable absorbent structures) with high wet strength, made without polyaminoamide-epihalohydrin (PAE) or polyamine-epichlorohydrin resins, and to wet laid paper and paperboard products with very low doses of PAE resins.

BACKGROUND

Many paper and paperboard products, such as disposable paper towels, napkins, and facial tissue, are absorbent structures that need to remain strong when wet. For example, paper towels need to retain their strength when absorbing liquid spills, cleaning windows and mirrors, scrubbing countertops and floors, scrubbing and drying dishes, washing/cleaning bathroom sinks and toilets, and even drying/cleaning hands and faces. A disposable towel that can perform these demanding tasks, while also being soft, has a competitive advantage as the towel could be multi-purpose and be used as a napkin and facial tissue. The same can be said about a napkin or facial tissue, where they could become a multi-purpose product if the right combination of quality attributes can be obtained of which strength when wet, absorbency, and softness are key attributes.

Wet strength is useful in a wide variety of paper and paperboard products, which may be described in terms of grades, including tissue, toweling, packaging, publication, and laminating grades. The paper and paperboard products that benefit from increased wet strength are useful in a wide variety of applications, some examples of which are facial tissue, kitchen towel, milk and juice cartons, produce boxes, paper bags, coffee filter, tea bags, and recycled liner board for corrugated containers. In all of these paper and paperboard products, whether intentionally or incidentally absorbent, increased wet strength can benefit intended uses during exposure to liquids, including during normal operation (e.g. drying with a towel, use of a tea bag, etc.) or from incidental contact (e.g. exposure of packaging to environmental moisture).

The industrial methods or technologies used to produce paper and paperboard products, including absorbent structures are numerous. In general, such technologies are implemented using a papermaking machine. Papermaking machines vary widely in design, but generally include sections for forming, consolidating, and drying a sheet from paper stock. The particular components and form of the machines also vary, and include different types such as cylinder machines, Fourdriner machines, twin-wire formers, multi-ply formers, and the like, as well as variations thereof. Examples of some such machines, as well as particular functions of components thereof, are described in U.S. Pat. Nos. 7,169,262 and 11,365,515, the contents of which are herein by reference in their entirety, as well as in other references incorporated herein. The technologies that use water to form the cellulosic (or other natural or synthetic fiber type) webs in the sheets that compose the paper and paperboard products, such as structured towel or wipe are called Water-Laid Technologies. These include Through Air Drying (TAD), Uncreped Through Air Drying (UCTAD), Conventional Wet Crepe (CWC), Conventional Dry Crepe (CDC), ATMOS, NTT, QRT and ETAD processes. Technologies that use air to form the webs are called Air-Laid Technologies. To enhance the strength and absorbency of these towels and wipes, more than one layer of web (or ply) can be laminated together using strictly a mechanical process or preferably a mechanical process that utilizes an adhesive.

Absorbent structures can be produced using both Water or Air-Laid technologies. The Water-Laid technologies of Conventional Dry and Wet Crepe are the predominant method to make these structures. These methods comprise forming a nascent web in a forming structure, transferring the web to a dewatering felt where it is pressed to remove moisture, and adhering the web to a Yankee Dryer. The web is then dried and creped from the Yankee Dryer and reeled. When creped at a solids content of less than 90%, the process is referred to as Conventional Wet Crepe. When creped at a solids content of greater than 90%, the process is referred to as Conventional Dry Crepe. These processes can be further understood by reviewing Yankee Dryer and Drying, A TAPPI PRESS Anthology, pg 215-219, the contents of which are incorporated herein by reference in their entirety. These methods are well understood and easy to operate at high speeds and production rates. Energy consumption per metric ton is low since nearly half of the water removed from the web is through drainage and mechanical pressing. Unfortunately, the sheet pressing also compacts the web which lowers web thickness and resulting absorbency.

Through Air Drying (TAD) and Uncreped Through Air Drying (UCTAD) processes are Wet-Laid technologies that avoid compaction of the web during drying and thereby produce absorbent structures of superior thickness and absorbency when compared to structures of similar basis weight and material inputs that are produced using the CWC or CDC process. Patents which describe creped through air dried products include U.S. Pat. Nos. 3,994,771, 4,102,737, 4,191,609, 4,529,480, and 5,510,002, while U.S. Pat. No. 5,607,551 describes an uncreped through air dried product. The contents of these patents are incorporated herein by reference in their entirety.

The remaining Wet-Laid processes termed ATMOS, ETAD, NTT, STT and QRT can also be utilized to produce absorbent structures. Each process/method utilizes some pressing to dewater the web, or a portion of the web, resulting in absorbent structures with absorbent capacities that correlate to the amount of pressing utilized when all other variables are the same. The ATMOS process and products are documented in U.S. Pat. Nos. 7,744,726, 6,821,391, 7,387,706, 7,351,307, 7,951,269, 8,118,979, 8,440,055, 7,951,269 or 8,118,979, 8,440,055, 8,196,314, 8,402,673, 8,435,384, 8,544,184, 8,382,956, 8,580,083, 7,476,293, 7,510,631, 7,686,923, 7,931,781, 8,075,739, 8,092,652, 7,905,989, 7,582,187, and 7,691,230, the contents of which are incorporated herein by reference in their entirety. The ETAD process and products are disclosed in U.S. Pat. Nos. 7,339,378, 7,442,278, and 7,494,563, the contents of which are incorporated herein by reference in their entirety. The NTT process and products are disclosed in international patent application WO 2009/061079 A1 and U.S. Patent Application Publication Nos. US 2011/0180223 A1 and US 2010/0065234 A1, the contents of which are incorporated herein by reference in their entirety. The QRT process is disclosed in U.S. Patent Application Publication No. 2008/0156450 A1 and U.S. Pat. No. 7,811,418, the contents of which are incorporated herein by reference in their entirety. The STT process is disclosed in U.S. Pat. Nos. 7,887,673, the contents of which are incorporated herein by reference in their entirety.

All of the aforementioned Wet Laid Technologies may produce a single or multilayered web of the absorbent structure. In order to create a multi-layered web, a double or triple layered headbox is utilized where each layer of the headbox can accept a different furnish stream.

To impart wet strength to the absorbent structure in the wet laid process, typically a cationic strength component is added to the furnish during stock preparation. The cationic strength component can include any polyethyleneimine, polyethylenimine, polyaminoamideepihalohydrin (preferably epichlorohydrin), polyamine-epichlorohydrin, polyamide, polyvinylamine, or polyvinylamide wet strength resin. Useful cationic thermosetting polyaminoamide-epihalohydrin ("PAE") and polyamine-epichlorohydrin resins are disclosed in U.S. Pat. Nos. 5,239,047, 2,926,154, 3,049,469, 3,058,873, 3,066,066, 3,125,552, 3,186,900, 3,197,427, 3,224,986, 3,224,990, 3,227,615, 3,240,664, 3,813,362, 3,778,339, 3,733,290, 3,227,671, 3,239,491, 3,240,761, 3,248,280, 3,250,664, 3,311,594, 3,329,657, 3,332,834, 3,332,901, 3,352,833, 3,248,280, 3,442,754, 3,459,697, 3,483,077, 3,609,126, 4,714,736, 3,058,873, 2,926,154, 3,877,510, 4,515,657, 4,537,657, 4,501,862, 4,147,586, 4,129,528, 3,855,158, 5,017,642, 6,908,983, 5,171,795, and 5,714,552, the contents of which are incorporated herein by reference in their entirety. Cationic thermosetting PAE resins are the most widely used wet strength resins in wet laid absorbent structures such as paper towel, napkin and facial tissue due to the chemistries ability to generate a high amount of wet strength at an affordable dosage. Unfortunately, during the synthesis of these PAE resins, byproducts are produced that are undesirable. These byproducts are called adsorbable organic halogens ("AOXs") and include 1,3-dichloro-2-propanol ("DCP") and 3-monochloro-1,2-propanediol ("CPD"). Known techniques for reducing the level of byproducts in PAE resins are disclosed in U.S. Pat. Nos. 5,470,742, 5,843,763, 5,871,616, 6,056,855, 6,057,420, 6,342,580, 6,554,961, 7,303,652, 7,175,740, 7,081,512, 7,932,349, 8,101,710, 5,516,885, 6,376,578, 6,429,267, and 9,719,212, the contents of which are incorporated herein by reference in their entirety. See, also, Crisp, Mark T. and Riehle, Richard J, Regulatory and sustainability initiatives lead to improved polyaminopolyamide-epichlorohydrin (PAE) wet-strength resins and paper products, TAPPI Journal, Vol. 17, No. 9, September 2018.

Techniques have been developed to reduce AOX in PAE resins. Those skilled in the art are familiar with industry terms such as G1, first generation PAE's with high AOX, G2 and G2.5 resins that feature reduced AOX (such as Kymene™ 925NA wet-strength resin and Kymene™ 217LX wet-strength resin, available from Solenis 2475 Pinnacle Drive, Wilmington, DE 19803 USA Tel: +1-866-337-1533) and also G3 resins such as Kymene™ GHP20 wet-strength resin also available from Solenis. G2 technology is taught in, for example, U.S. Pat. Nos. 5,017,642, 6,908,983, 5,171,795, and 5,714,552, the contents of which are hereby incorporated by reference in their entirety. G2 resins typically have less than 1000 ppm DCP by weight, and G3 resins typically contain less than 10 ppm DCP by weight. Those skilled in the art have also noted that in attempt to reduce AOX, the efficiency and functionality of the resin is compromised. Higher application levels are needed to achieve tensile targets.

As discussed, to impart wet strength to the absorbent structure in a wet laid process, a cationic strength component may be added to the furnish during stock preparation. To impart capacity for the cationic strength resins it is well known in the art to add water soluble carboxyl containing polymers to the furnish in conjunction with the cationic resin. Suitable carboxyl containing polymers include carboxymethylcellulose ("CMC") as disclosed in U.S. Pat. Nos. 3,058,873, 3,049,469 and 3,998,690, the contents of which are incorporated herein by reference in their entirety.

Absorbent structures are also made using the Air-Laid process. This process spreads the cellulosic, or other natural or synthetic fibers, in an air stream that is directed onto a moving belt. These fibers collect together to form a web that can be thermally bonded or spray bonded with resin and cured. Compared to Wet-Laid, the web is thicker, softer, more absorbent and also stronger. It is known for having a textile-like surface and drape. Spun-Laid is a variation of the Air-Laid process, which produces the web in one continuous process where plastic fibers (polyester or polypropylene) are spun (melted, extruded, and blown) and then directly spread into a web in one continuous process. This technique has gained popularity as it can generate faster belt speeds and reduce costs.

To further enhance the strength of the absorbent structure, more than one layer of web (or ply) can be laminated together using strictly a mechanical process or preferably a mechanical process that utilizes an adhesive. It is generally understood that a multi-ply structure can have an absorbent capacity greater than the sum of the absorbent capacities of the individual single plies. It is thought this difference is due to the inter-ply storage space created by the addition of an extra ply. When producing multi-ply absorbent structures, it is critical that the plies are bonded together in a manner that will hold up when subjected to the forces encountered when the structure is used by the consumer. Scrubbing tasks such as cleaning countertops, dishes, and windows all impart forces upon the structure which can cause the structure to rupture and tear. When the bonding between plies fails, the plies move against each other imparting frictional forces at the ply interface. This frictional force at the ply interface can induce failure (rupture or tearing) of the structure thus reducing the overall effectiveness of the product to perform scrubbing and cleaning tasks.

There are many methods used to join or laminate multiple plies of an absorbent structure to produce a multi-ply absorbent structure. One method commonly used is embossing. Embossing is typically performed by one of three processes: tip to tip (or knob to knob), nested, or rubber to steel ("DEKO") embossing. Tip to tip embossing is illustrated by commonly assigned U.S. Pat. No. 3,414,459, while the nested embossing process is illustrated in U.S. Pat. No. 3,556,907, the contents of which are incorporated herein by reference in their entirety. Rubber to steel DEKO embossing comprises a steel roll with embossing tips opposed to a pressure roll, sometimes referred to as a backside impression roll, having an elastomeric roll cover wherein the two rolls are axially parallel and juxtaposed to form a nip where the embossing tips of the emboss roll mesh with the elastomeric roll cover of the opposing roll through which one sheet passes and a second un-embossed sheet is laminated to the embossed sheet using a marrying roll nipped to the steel embossing roll. In an exemplary rubber to steel embossing process, an adhesive applicator roll may be aligned in an axially parallel arrangement with the patterned embossing roll, such that the adhesive applicator roll is upstream of the nip formed between the emboss and pressure roll. The adhesive applicator roll transfers adhesive to the embossed web on the embossing roll at the crests of the embossing knobs. The crests of the embossing knobs typically do not touch the perimeter of the opposing idler roll at the nip formed therebetween, necessitating the addition of a marrying roll to apply pressure for lamination.

Other attempts to laminate absorbent structure webs include bonding the plies at junction lines wherein the lines include individual pressure spot bonds. The spot bonds are formed by the use of a thermoplastic low viscosity liquid such as melted wax, paraffin, or hot melt adhesive, as described in U.S. Pat. No. 4,770,920. Another method laminates webs of absorbent structure by thermally bonding the webs together using polypropylene melt blown fibers as described in U.S. Pat. No. 4,885,202. Other methods use meltblown adhesive applied to one face of an absorbent structure web in a spiral pattern, stripe pattern, or random pattern before pressing the web against the face of a second absorbent structure as described in U.S. Pat. Nos. 3,911,173, 4,098,632, 4,949,688, 4,891249, 4,996,091 and 5,143,776, the contents of which are incorporated herein by reference in their entirety.

Certain wet strength resins, such as some of the PAE resins introduced above, can also provide increased dry strength to paper products. Such dry strength improvements are increasingly important, particularly in light of the trend for paper manufacturers to use recycled fibers in paper and paperboard products in order to achieve lower costs. This trend is driven by stricter legislative standards that are being imposed on the paper industry, along with continuing pressure from environmentally-conscious paper users to increase the recyclability (e.g. repulpability) of paper products.

The process of repulping generally refers to any mechanical action that disperses dry, pulp fibers into an aqueous pulp fiber suspension. Conditions for repulping, as well as equipment commercially used, are discussed in "Handbook for Pulp & Paper Technologists, Second Edition" by G. A. Smook, Angus Wilde Publications, 1992, pp. 194-195 and 211-212, which reference is incorporated herein by reference in its entirety. Conditions for repulping depend to a substantial degree on the type of paper that is used. For paper containing no wet strength resin, repulping can take place readily in water at any temperature. The water may contain additional ingredients such as wetting agents and pH buffers and relatively high temperatures (e.g. 50° C., or higher) can be used.

A number of methods are available to determine the repulpability of paper and paperboard. For example, in the laboratory, repulpability is conveniently determined using a disintegrator described in TAPPI method T205 OM-88, (1988), which is incorporated herein by reference in its entirety. Some methods compare wet strengthened paper and paperboard at substantially equal wet strength after a 2 hour soak and fully saturated (fully wetted) with aqueous medium, preferably with water. For example, Tappi Method T456 defines saturation as the state when water has completely penetrated and filled the fibrous structure network to its maximum, steady state level under the conditions described in this method. As indicated in Tappi Method T456, complete saturation of certain types of paper, particularly paperboard, may be significantly accelerated by immersion in (a) degassed distilled water, (b) ordinary distilled water, carrying out the immersion at reduced pressure, or (c) by the addition of a wetting agent to the water. For paper and paperboard with sizing agents (e.g., liquid packaging board, carrier board, liner board and medium for produce boxes), full wetting can typically be achieved with by vacuum soaking, e.g. by 2-3 successive vacuum—atmospheric pressure cycles. With some paper grades, full wetting can be achieved by the use of surfactants.

In view of the above, efforts to make paper and paperboard with high levels of wet and dry strength and improved recyclability are well documented in the literature (for example, U.S. Pat. Nos. 11,015,287, 9,777,434, 9,212,453, 7,589,153, 6,103,861, 5,783,041, 5,674,362, 5,466,337, 5,427,652, the contents of which are incorporated herein by reference in their entirety). For example, some of the PAE wet-strength resins introduced above are used to impart both dry and wet strength to paper products.

Unfortunately, however, while high wet strength is desirable in many applications, papers having such characteristics are often repulpable only under severe conditions. Relatedly, recycling is often difficult for some paper products containing PAE wet-strength resins, due in part to limited repulpability.

In view of the above, there is a continuing need for absorbent products with high wet strength, absorbency, and softness that are produced without any undesirable byproducts. There is also a need for methods and compositions to impart substantial wet and dry strength to paper products with improved repulpability.

SUMMARY OF THE INVENTION

An object of the present invention is to provide a method of producing paper or paperboard products having high wet strength using no or very low doses of PAE wet strength resin that contain or generate AOX byproducts, as well as products prepared therewith. One implementation provides a method of preparing paper and paperboard structures with high wet strength, made without polyaminoamide-epihalohydrin (PAE) or polyamine-epichlorohydrin resins and to paper and paperboard structures using lower doses of PAE resins while achieving the same targeted high wet strength levels. Another implementation provides a method of making single or multi-ply, cellulosic based, wet laid, disposable, absorbent structures of high wet strength, absorbency, and softness, using no or very low doses of PAE wet strength resin that contain or generate AOX byproducts.

A paper or paperboard product according to exemplary embodiments of the present invention comprises: lignocellulosic and/or cellulosic fibers; a dichloropropanol concentration of less than 50 ppb; at least 0.05% by weight ultra-high molecular weight glyoxalated polyvinylamide (UHMW GPVM) adducts and high molecular weight anionic polyacrylamide (HMW APAM) complex; a chloropropanediol concentration of less than 300 ppb; from 0 to 0.09% by weight polyaminoamide-epihalohydrin; and a wet tensile strength of at least 10% of the value of a dry tensile strength of the product.

In some exemplary embodiments, the paper or paperboard product comprises from 0.25 to 1.5% by weight of the UHMW GPVM adducts and HMW APAM complex.

In some exemplary embodiments, the UHMW GPVM adducts and HMW APAM complex comprises HMW APAM having a weight average molecular weight (Mw) of from greater than 500,000 to 2,000,000 daltons and/or UHMW GPVM adducts having a weight average molecular weight (Mw) of from 8,000,000 to about 25,000,000 daltons. In certain embodiments, the UHMW GPVM adducts and HMW APAM complex comprises HMW APAM having an acrylic acid to acrylamide molar ratio of from 7:93 to 40:60.

In some exemplary embodiments the paper or paperboard product is free from the polyaminoamide-epihalohydrin as measured using an "Adipate test".

In some exemplary embodiments the wet tensile strength of the paper or paperboard product is at least 20% of the value of the dry tensile strength of the product.

A paper or paperboard product according to an exemplary embodiment comprises: from 80 to 99% by weight lignocellulosic and/or cellulosic fibers; from 0.05 to 1.5% by weight UHMW GPVM adducts and HMW APAM complex; and from 0 to 0.5% by weight polyvinylamine.

In some exemplary embodiments, the product comprises from 0.25 to 1.5% by weight of the UHMW GPVM adducts and HMW APAM complex.

In some exemplary embodiments, the UHMW GPVM adducts and HMW APAM complex comprises HMW APAM having a weight average molecular weight (Mw) of from greater than 500,000 to 2,000,000 daltons and/or UHMW GPVM having a weight average molecular weight (Mw) of from 8,000,000 to about 25,000,000 daltons. In certain embodiments, the UHMW GPVM adducts and HMW APAM complex comprises HMW APAM having an acrylic acid to acrylamide molar ratio of from 7:93 to 40:60.

In some exemplary embodiments the product exhibits a repulping time at least 20% less than a similar PAE resin-treated paper or paperboard product having a comparable defibering level and a substantially equal wet strength, after a 2 hour soak and when fully wetted. In some such embodiments, the product exhibits the repulping time of at least 20% less than the similar PAE resin-treated paper or paperboard product during repulping in water at a pH equal to or greater than about 9.

In some exemplary embodiments the paper or paperboard product comprises from 0.01 to 0.5% by weight of the polyvinylamine.

A retail roll towel product according to an exemplary embodiment of the present invention comprises: a two-ply cellulose sheet or web having a cross direction wet strength of 80 to 200 N/m and a two-ply caliper of 600 to 1500 microns, where the retail roll towel product contains 0 to 550 ppb chloropropanediol and 0 to 0.09% by weight polyaminoamide-epihalohydrin.

In exemplary embodiments, the cross direction wet strength of the towel product is 80 to 150 n/m, the two-ply caliper is 700 to 1300 microns, and the towel product has a basis weight of 38 to 50 g/m2, wherein the retail roll towel product contains 50 to 550 ppb chloropropanediol and 0.01 to 0.04% by weight polyaminoamide-epihalohydrin. A tissue or paper towel product according to an exemplary embodiment of the present invention comprises: 95 to 99 percent by weight cellulose fibers; and 0.25 to 1.5 percent by weight ultra-high molecular weight glyoxalated polyvinylamide adducts and high molecular weight anionic polyacrylamide complex.

A tissue or paper towel product according to an exemplary embodiment comprises: 95 to 99 percent by weight cellulose fibers; 0.25 to 1.5 percent by weight ultra-high molecular weight glyoxalated polyvinylamide adducts and high molecular weight anionic polyacrylamide complex; and 0.03 to 0.5 percent by weight polyvinylamine.

A method of preparing a paper or paperboard product (the "preparation method") according to an exemplary embodiment of the present invention comprises: forming an aqueous stock mixture comprising 80 to 99% by weight solids lignocellulosic and/or cellulosic fibers, from 0.05 to 1.5% by weight solids ultra-high molecular weight glyoxalated polyvinylamide (UHMW GPVM) adducts and high molecular weight anionic polyacrylamide (HMW APAM) complex, from 0 to 0.09% by weight solids of a polyaminoamide-epihalohydrin, and from 0 to 0.5% by weight solids of a polyvinylamine; and sheeting and drying the aqueous stock mixture, thereby giving the product.

In an exemplary embodiment of the preparation method, the aqueous stock mixture is formed without addition of the polyaminoamide-epihalohydrin, and the product is free from the polyaminoamide-epihalohydrin as measured using an "Adipate test".

In some exemplary embodiments, the UHMW GPVM adducts and HMW APAM complex used in the preparation method comprises HMW APAM having a weight average molecular weight (Mw) of from greater than 500,000 to 2,000,000 daltons and/or UHMW GPVM adducts having a weight average molecular weight (Mw) of from 8,000,000 to about 25,000,000 daltons. In certain embodiments, the UHMW GPVM adducts and HMW APAM complex comprises HMW APAM having an acrylic acid to acrylamide molar ratio of from 7:93 to 40:60.

In an exemplary embodiment of the preparation method, the aqueous stock mixture is formed with 0.03 to 0.5% by weight solids of the polyvinylamine.

In an exemplary embodiment of the preparation method, the paper or paperboard product comprises a dichloropropanol concentration of less than 50 ppb and a chloropropanediol concentration of less than 300 ppb.

A method of making an absorbent structure according to an exemplary embodiment of the present invention comprises: forming a stock mixture comprising cellulose fibers, high molecular weight anionic polyacrylamide, and ultra-high molecular weight glyoxalated polyvinylamide adducts; and at least partially drying the stock mixture to form a web using a wet laid process, wherein no polyaminoamide-epihalohydrin is added to the stock mixture.

In exemplary embodiments, the absorbent structure has a dichloropropanol concentration of less than 50 ppb and a chloropropanediol concentration of less than 300 ppb.

In exemplary embodiments, the stock mixture further comprises: an additive selected from the group consisting of lignin, laccase polymerized lignin, hemicellulose, polymerized hemicellulose, hemp hurd, pectin, hydroxyethyl cellulose, carboxymethyl cellulose, guar gum, soy protein, chitin, polyvinylamine, polyethylenimine, and combinations thereof.

An absorbent product according to an exemplary embodiment of the present invention comprises cellulose fibers, a dichloropropanol concentration of less than 50 ppb and a chloropropanediol concentration of less than 300 ppb, and a cross direction wet strength of 80 to 200 n/m, wherein the product is free from polyaminoamide-epihalohydrin as measured using an "Adipate test".

In exemplary embodiments, the absorbent product is through air dried facial tissue, napkin, or towel.

A tissue product according to an exemplary embodiment of the present invention comprises: a two-ply creped through air dried retail towel with a cross direction wet strength of 80 to 150 N/m, a dry caliper of 700 to 1200 microns, measured chloropropanediol from 50 to 400 parts per billion in paper that makes up the product and measured dichloropropanol from 30 to 200 parts per billion in the paper, wherein polyvinyl amine is added to a wet-end of a papermaking machine used to make the tissue product.

A tissue product according to an exemplary embodiment of the present invention comprises: a two-ply creped through air dried retail towel with a cross direction wet strength of 80 to 150 N/m; a dry caliper of 700 to 1200 microns; measured chloropropanediol from 50 to 300 parts per billion in paper that makes up the product; and measured dichloropropanol from 5 to 50 parts per billion in the paper, wherein no PAE resin is added to a wet-end of a papermaking machine used to make the tissue product.

DESCRIPTION OF THE DRAWINGS

Various exemplary embodiments of this invention will be described in detail, with reference to the following figures, wherein:

FIG. 9 provides a table of results of measured DCP, CDP and PAE of commercially available samples of paper towels.

DETAILED DESCRIPTION

Figure 1:
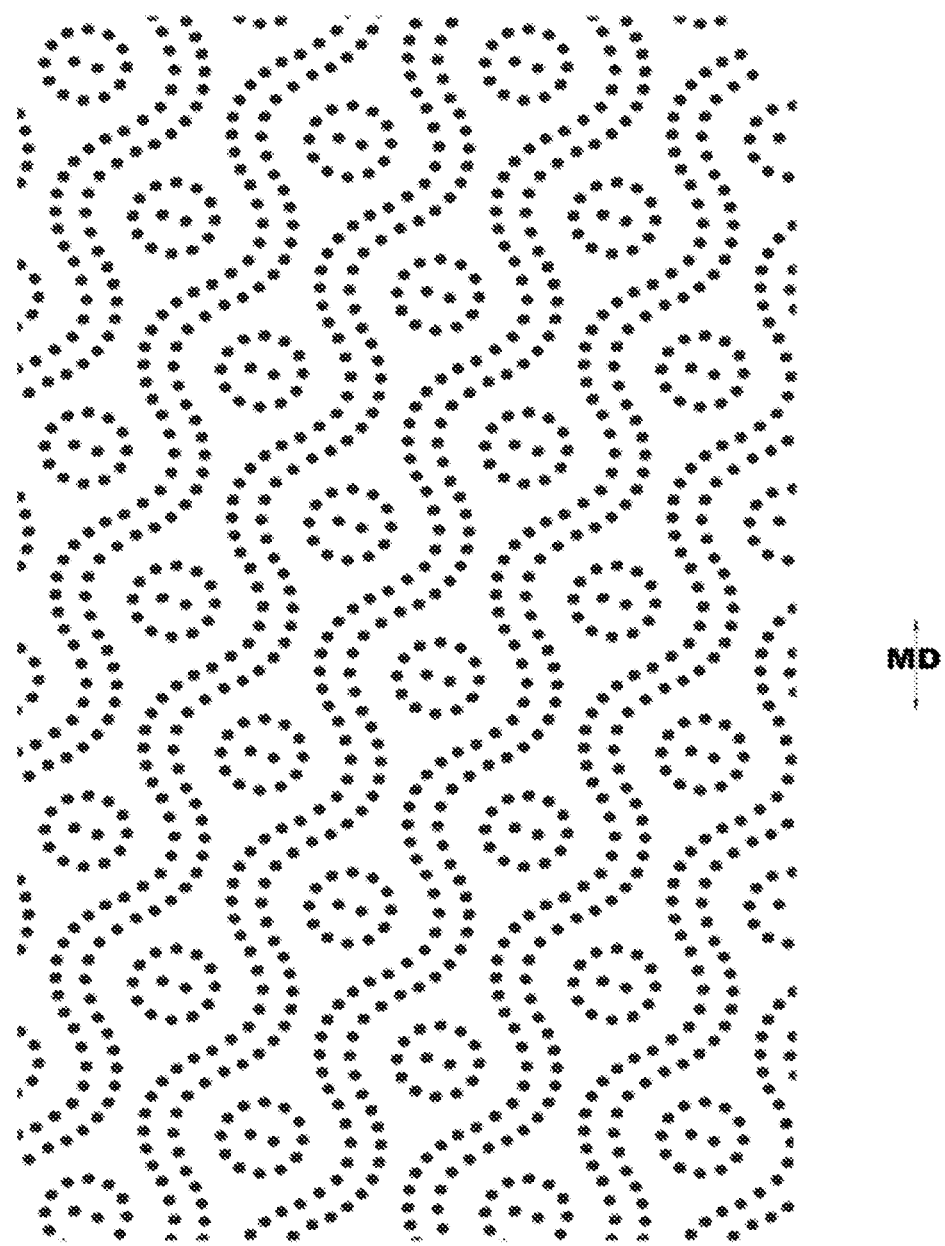
FIG. 1 shows a pattern formed on an absorbent structure in accordance with an exemplary embodiment of the present invention.

A method of preparing paper and paperboard structures with high wet strength, made without polyaminoamide-epihalohydrin (PAE) or polyamine-epichlorohydrin resins is provided herein. The method may be used to prepare paper and paperboard structures having lower doses of PAE resins, while achieving the same targeted high wet strength levels and achieving improved repulpability and recyclability, as comparable structures made with PAE resins. Paper and paperboard structures using lower doses of PAE resins, with targeted high wet strength levels, are also provided.

For the purposes of the description provided herein, the term "low doses of PAE resins" or "very low doses of PAE resins" refers to an absorbent structure (e.g. a paper or paperboard product) that contains less than 2.5 kg of PAE per bone dry metric ton of the absorbent structure. In specific embodiments, the term "very low doses of PAE resins" may be used to refer to a specific range or threshold depending on the type of the absorbent structure. For example, the term may be used to refer to a tissue or towel product as the absorbent structure that contains that contains less than 2.5 kg of PAE per dry metric ton. The term may also be used to refer to a different kind of paper or paperboard product as the absorbent structure, which contains less than 2 kg of PAE per dry metric ton, alternatively less than 1.5 kg, alternatively less than 1 kg/ton of PAE per ton.

As used herein, the term "paper or paperboard product" (or, more simply, "paper or paperboard", or just "paper product" or "paper") will be understood by those of skill in the art to include various grades of paper and paperboards. Examples include any of the various grades of paper that benefit from enhanced wet strength and/or dry strength, such as linerboard, bag, boxboard, copy paper, container board, corrugating medium, file folder, newsprint, paper board, packaging board, printing and writing, tissue, towel, and publication. These paper grades can be comprised of any typical pulp fibers including groundwood, bleached or unbleached Kraft, sulfate, semi-mechanical, mechanical, semi-chemical, and recycled. They may or may not include inorganic fillers. Further limitations on the scope of applicable paper products will be understood in view of the description herein. If not explicitly stated otherwise, for the purpose of this disclosure, the terms "paper-making process" and "method for the manufacture of paper" refer to the manufacturing of paper, as well as to the manufacturing of paperboard and/or cardboard, in accordance with the above.

In specific embodiments, the paper or paperboard products are defined in terms of particular absorbent structures, such as tissue or paper towel products. However, as will be understood in view of the description herein, the methods and products of the present disclosure are not so limited, and include many paper and paperboard products.

As used herein, the terms "absorbent structure" and "absorbent product" may be used interchangeably unless otherwise denoted.

In exemplary embodiments, the paper or paperboard product (e.g. an absorbent product) is made without PAE and therefore exhibits no presence of PAE (to the detectable limit of measurement methods) with analysis using an adipate and/or a glutarate specific method, and further, the product contains down to environmental background non-detect levels of DCP and CPD.

The processes for making paper utilizing the compositions of the disclosure, described further below, are exemplified by the steps of: (a) providing an aqueous stock mixture (i.e., a pulp suspension); (b) adding a strength composition to the aqueous stock mixture; and (c) sheeting and drying the aqueous stock mixture produced in (b), to obtain the paper or paperboard product.

The stock mixture may be a papermaking furnish or other aqueous pulp suspension, and can be a mixture of lignocellulosic fibers, cellulosic fibers, and fillers. Fillers can be inorganic fillers, such as calcium carbonate or clay, or organic fillers. Recycled fiber typically is a mixture of fiber types and filler types. In general, it will be understood that the stock mixture in (a) is typically prepared with pulp, which generally comprises cellulose fibers. Typically, these include cellulosic and/or lignocellulosic fibers, and may be prepared from material containing wood-based pulp from groundwood to chemically bleached wood or a non-wood based pulp or a combination of pulps. In addition, the pulp may be obtained in whole or in part from recycled paper and paper products. The pulp may contain some synthetic pulp. The pulp may be some combination of pulp types, such as hardwood and soft wood or a certain type of wood, such as Eucalyptus. The pulp may be groundwood pulp, mechanical pulp, chemically or thermally treated pulp, kraft pulp, sulfite pulp or synthetic pulp or any other common pulp used in the paper industry.

The stock mixture of step (a) of the process is obtained by means well known in the art, such as known mechanical, chemical and semi chemical, etc., pulping processes. Normally, after the mechanical grinding and/or chemical pulping step, the pulp is washed to remove residual pulping chemicals and solubilized wood components. Either bleached or unbleached pulp fiber may be utilized in the process of this invention. Recycled pulp fibers are also suitable for use.

In some aspects of the current method, the strength composition may be used in treating all types of cellulosic fibers, such as lignocellulosic fiber including bleached, unbleached virgin fiber, mechanical fiber and OCC recycled fiber. In some aspects of the current method, the strength composition may be used to treat a mixture of bleached fiber, unbleached virgin fiber and recycled fiber at a certain fiber mixing ratio. In other aspects, the strength composition of the current method is useful in providing improved dry strength properties of recycled linerboard produced in papermaking. The strength composition may work effectively with poor quality recycled fiber from Asia such as TOCC (Taiwan OCC), COCC (Chinese OCC), EOCC (European OCC), and better quality AOCC (American OCC) as well as unbleached Kraft fiber (UBSK). The degree of the improvement in a specific strength property varies with fiber type and treatment conditions.

In some aspects of the current method, the strength composition may be used in treating a pulp slurry or as a pulp and filler slurry. The slurry may be any known in the art, for example, based on virgin pulp, deinked pulp (DIP), unbleached Kraft pulp (UBK), mechanical pulps like thermal mechanical pulp (TMP), semi-chemical mechanical pulps like neutral sulfite semi-chemical (NSSC), old corrugated containers (OCC), recovered newspaper, recovered tissue or other fiber sources. The pulp may be present in the slurry in any amount known in the art.

For the purpose of the specification, the cellulosic starting material for the manufacturing of paper, paperboard and/or cardboard, may originate from recovered (waste) paper. Such material may be referred to as "recycle material", whereas fresh starting material is referred to as "virgin material". It is also possible that a blend of virgin material and recycle material is used as the starting material for the paper making process (i.e., in the stock mixture), which is herein referred to as "blend material". Furthermore, it is also possible that the cellulosic starting material is "broke" or "coated broke" which, for the purpose of the specification, shall be encompassed by the term "recycle material".

In a recycling operation, it is currently preferred to separate paperboard with high wet strength from paperboard with low wet strength (typically not treated with PAE resins). For optimum recyclability and fiber recover, repulping conditions for paper and paperboard with high wet strength preferably have no additional chemicals added to the repulper so that mixtures of paper and paperboard with high wet strength and low wet strength can be repulped together. Preferably, repulpability is sufficient to allow certification by various organizations. For example by the Fibre Box Association (FBA), which allows boxes to be certified, and marked as recyclable for easy identification, when the treatment material has passed a testing protocol assuring acceptability by the recyclers of old corrugated containers (OCC).

The composition of the current method can be introduced into a pulper during the pulping stage, or brought into contact at any stock storage chest, high consistency chest or other holding tank.

A range of cellulosic fiber types, lignocellulosic fiber types, and filler types may be used in the stock mixture. The amount of fiber is typically in range of from 70 to 99% by weight. For example, a paper or paperboard product prepared according to the present embodiments can comprise, 70 to 99, 80 to 99, 85 to 99 or 90 to 99 percent by weight lignocellulose fibers. In the stock mixture these amounts may refer to the weight percent solids. Alternatively, one of skill in the art will understand that additional weight solids may be used in the stock mixture to prepare a product with a fiber fill amount in the above ranges.

In specific embodiments, the stock mixture, as an aqueous suspension of the cellulosic fibers, comprises both virgin and recycled fiber. In some embodiments, the aqueous suspension comprises at least 30% virgin fiber, such as at least 70%, alternatively at least 90%, alternatively at least 95%, alternatively at least 99% virgin fibers (w/w), based on the total weight of cellulosic fibers in the suspension. In some such embodiments, the aqueous suspension is an unbleached kraft (UBK) virgin furnish.

In some embodiments, the stock mixture, as an aqueous suspension of the cellulosic fibers, comprises recycled fiber. The amount of recycled fiber may vary, and may be used to supplement virgin fiber or as the predominant fiber source in the aqueous suspension. Accordingly, the aqueous suspension may comprise recycled fiber in an amount of at least 1, alternatively at least 5, alternatively at least 10, alternatively at least 20, alternatively at least 30, alternatively at least 50, alternatively at least 75% recycled fiber (w/w), based on the total weight of cellulosic fiber in the suspension. It will be understood that recycled fiber may originate from mixed paper grades, old corrugated cardboard (OCC), etc.

In some embodiments, the strength composition may be used in treating a difficult furnish, i.e., a furnish with a relatively high content of lignan, and possibly other dissolved and/or suspended colloidal anionic materials. For example, the strength composition may be used with high-kappa furnishes, i.e., furnishes of pulp having a kappa number of at least 20, alternatively at least 25, alternatively at least 30, alternatively at least 32, alternatively at least 35, alternatively at least 40.

The term "kappa" used herein in the context of the strength composition and methods of using the same is to be understood according to the conventional meaning of the industry standard kappa number. As such, it will be understood that kappa numbers are employed as a key test method for determining the content/level of lignin remaining in a sample of finished or in-process pulp. In this fashion, kappa number can be used a measure of the completeness of a given pulping process, and may be used to characterize and/or differentiate types of furnishes on the basis of relative lignin content. The type of pulp is not particularly limited with respect to kappa number determination, with generally-accepted standards being suitable for use in determining kappa numbers across a wide range of pulps, including chemical, semi-chemical, unbleached, semi-bleached, and bleached varieties. For example, the kappa number of a given furnish can be determined via use of a strong oxidant (e.g. potassium permanganate), which reacts with lignin as well as small levels of certain other organic impurities remaining in pulp at various process stages. The kappa number of a particular sample may be determined manually (e.g. via laboratory reaction and analysis), or via use of an automated instrument suitable for measuring kappa number. It will be understood that a given procedure and/or instrument may need to be validated based on the particulars of a given standard in order to determine agreement of results with the standard itself. Examples of kappa number standards include Test Method TAPPI/ANSI T 236 om-13 (November 2013), provided by the Technical Association of the Pulp & Paper Industry Inc. (TAPPI) and approved by the American National Standards Institute (ANSI). As written, the TAPPI/ANSI T 236 om-13 standard is intended for use in the laboratory testing of pulps. It is recognized, however, that kappa number is widely used as an in-process test in the pulp and paper mill, in some cases with modifications.

Typically, kappa numbers are reported as a value of from 1 to 100. However, values higher than 100 may be determined, although it is understood that above a kappa number of 100 precision of a given test may decrease. Section 16 of the TAPPI/ANSI T 236 om-13 standard sets forth information regarding unintended or unexpected impact that certain deviations from the standard can have on data accuracy, precision, or both.

In certain cases, the kappa number can be used to quantify, or at least approximate, the lignin content of a particular pulp sample. For example, there is a nearly linear relationship between the kappa number and both Klason lignin and chlorine number for pulps below 70% total yield, such that a kappa number determined according to the TAPPI/ANSI T 236 om-13 standard may be used to approximate the percentage of Klason lignin in a sample according to the equation Lignin level (%)=Kappa number×0.13. However, it is to be understood that there is no general and unambiguous relationship between the kappa number value and the exact content of lignin or other organic impurities across pulps. Rather, any such relationship can vary depending on the wood specie(s), pulping process(es), and delignification procedures employed to obtain the specific pulp prepared. Accordingly, when kappa number is to be used to determine a precise numerical value regarding the amount of lignin present in a specific furnish, such as those suitable for use in the present embodiments, a more precise relationship can be established by testing the pulp therein according to processes and procedures widely known in the art.

In certain embodiments, the strength composition is used with furnishes of pulp having a kappa number of from 1 to 30, such as from 1 to 25, alternatively from 1 to 20, alternatively from 1 to 15. The particular furnish will be selected by one of skill in the art in view of the particular paper or paperboard product being prepared, the process conditions being employed, etc.

In accordance with exemplary embodiments, the method involves the use of the strength composition as introduced above. More specifically, the strength composition comprises a glyoxalated polyamide component, and an anionic polyacrylamide component, which are described in turn below. The compounds selected as the glyoxalated polyamide component and the anionic polyacrylamide component may compose all or part of the strength composition. Additionally, it will be appreciated from the specific components described herein that the two components of the strength composition may be supplied separately or together (e.g. combined), and likewise used in combination in the method herein either as a pre-mixed combination or instead as discreet components added together or separately to the stock mixture.

The glyoxalated polyamide component of the strength composition comprises ultrahigh-molecular weight ("UHMW") glyoxalated polyvinylamide ("GPVM") adducts, and may include high-molecular weight ("HMW") and/or high-cationic charge glyoxalated polyacrylamide ("GPAM") copolymers, or combinations thereof. It will be understood by those of skill in the art that the terms "glyoxalated polyvinylamide adducts" and "GPVM" used in this fashion may encompass GPAMs, as the industry use of the terms overlap in scope depending on the particular components of the polymers prepared. As such, for the purpose of this disclosure, the term "GPVM adduct" is to be understood broadly to include glyoxalated polyamides prepared using acrylamido- and/or vinylamido-based prepolymers, which are described in further detail below. Specific reference to a particular polyvinylamide or polyacrylamide will be used when differentiation between the two is needed. For example, the term "GPAM/APAM" complex as used below refers to specific embodiments where a GPAM-based GPVM adduct is used in the strength composition.

The GPVM adducts may be prepared or obtained. Methods to prepare GPVM adducts are known in the art. For example, methods of preparing UHMW GPVM are documented in U.S. Pat. No. 7,875,676 B2 and U.S. Pat. No. 9,879,381 B2, the contents of which are incorporated herein by reference in their entirety. These patents also characterize the polymer and the prepolymers involved, including the molecular weights thereof. Methods to prepare HMW and/or high cationic charge GPAM copolymers are documented in U.S. Pat. No. 9,644,320, the contents of which are incorporated herein by reference in their entirety.

In some embodiments, the weight average molecular weight for UHMW GPVM adducts is greater than 2,000,000 daltons and less than 50,000,000 daltons, such as from about 5,000,000 to about 40,000,000 daltons, from about 8,000,000 to about 25,000,000 daltons, from about 10,000,000 to about 20,000,000 daltons or from about 12,000,000 daltons to about 18,000,000 daltons. The Mw for the UHMW GPVM adducts may be determined using the batch mode MALS method described below.

In some embodiments, the UHMW GPVM has a radius of gyration (Rg) of at least about 100 nm. In some embodiments, the UHMW GPVM has a Rg of at least about 20 nm, such as at least about 140, alternatively at least about 150, alternatively at least about 160, alternatively at least about 170 nm.

The UHMW GPVM typically has a charge density of from about 0.2 to about 3 mEq./g, at pH 7. In some embodiments, the UHMW GPVM has a charge density of from about 1 to about 3, mEq./g, at pH 7.

The anionic polyacrylamide component comprises a high molecular weight ("HMW") anionic polyacrylamide ("APAM"). HMW APAM is defined as having a molecular weight greater than 500,000 Daltons and can be an inverse emulsion product or a solution product, with a solution product being preferred.

In some embodiments, the weight average molecular weight (Mw) for HMW APAM is greater than 500,000 daltons and less than about 2,000,000 daltons, such as from about 550,000 to about 1,500,000 daltons, alternatively from about 550,000 to about 1,000,000 daltons. The Mw for HMW APAM may be determined using the size exclusion chromatography (SEC) method below.

In some embodiments, the acrylic acid to acrylamide molar ratio for the HMW APAM is greater 7:93 and less than 40:60, preferably greater than 12:88 and less than 35:65, preferably greater than 15:85 and less than 30:70. In some embodiments, the strength additive comprises HMW APAM having an acrylic acid to acrylamide molar ratio of from 7:93 to 40:60. In certain embodiments, the strength additive comprises HMW APAM having an acrylic acid to acrylamide molar ratio of from 12:88 to 35:65.

This disclosure also characterizes the polymers and the prepolymers including the molecular weight. The standard viscosity of the high molecular weight anionic polyacrylamide (measured from 0.1 weight % polymer solution in 1 M NaCl at 25° C. using a Brookfield viscometer with a UL adapter at 60 rpm) may be less than 1.5 or less than 1.6 or less than 1.7 or less than 1.8.

The strength composition, through the use of the two or three or more chemistries of the individual components (referred herein as wet strength agents) provides wet tensile strength of at least 10%, for example 15% or 20% or 25% or 30% of the value of the dry tensile strength of the paper or paperboard product measured either in a cross direction or machine direction of the paper or paperboard product.

In some embodiments, the method utilizes UHMW GPVM having a weight average molecular weight (Mw) of from 8,000,000 to about 25,000,000 daltons, and HMW APAM having a Mw of from greater than 500,000 to 2,000,000 daltons. In certain embodiments, the method utilizes UHMW GPVM having a Mw of from 10,000,000 to about 20,000,000 daltons and HMW APAM having a Mw of from 550,000 to 1,500,000 daltons.

In embodiments, polyvinylamine (PVAM) chemistries, via components separate than those described above with respect to the UHMW GPVM adducts and HMW APAM, can also greatly enhance the effectiveness of the wet strength system without adding PAE or chlorinated organics into the mixture.

In some embodiments, a PAE resin and/or a polyvinylamine are included in the strength composition or otherwise added to the stock mixture.

The strength composition of the current method may be used in combination with other papermaking performance additives to improve paper product properties, such as cationic, anionic, amphoteric, a nonionic synthetic compounds and natural polymers. Examples of compounds suitable for use with the composition of the current method include, but are not limited to, dry strength papermaking additives, such as starch, starch derivatives, polyacrylamide derivatives, guar, poly(vinylamine), contaminant control detackifiers or fixative detackifiers, such as nonionic or anionic detackifiers, hydrophobically end-capped poly(ethylene glycol), poly(vinyl alcohol-vinyl acetate), whey protein, soy protein, hydrophobic and hydrophilic block copolymers, hydrophobically modified hydroxyethyl cellulose, wet strength papermaking additives including, but not limited to polyethyleneimine, urea formaldehyde resin, epichlorohydrin reacted poly(aminoamide), starch aldehyde, glyoxalated poly(acrylamide); flocculants for water treatment; coagulants for water treatment; drainage aids for papermaking; retention aids for papermaking; sizing agent for paper products; adhesives; debonders; softeners; creping adhesives; plasticizers for optimizing resin properties; and modifiers for optimizing resin properties. Individual components of any of the above combinations may be applied together or sequentially in papermaking. Additionally, individual components listed above may be used in combination or blended together prior to use to make stable formulations or they can be combined on site at a paper mill prior to use.

In some embodiments, the strength composition is used in combination with one or more conventional paper auxiliaries. Examples include sizing agents, retention aids based on synthetic polymers and also dual systems, drainage aids, optical brighteners, defoamers, biocides, and paper dyes. Specific examples of such auxiliaries are known in the art, and include those listed in the references incorporated herein. For example, useful sizing agents include alkyl ketene dimers (AKDs), alkenylsuccinic anhydrides (ASAs) and rosin size, etc. These conventional paper additives are usable in the customary amounts.

In some embodiments, the strength composition is specifically free from, alternatively substantially free from, certain conventional paper additives. For example, while one of the benefits of the present embodiments is the ability to reduce or eliminate PAE usage, other strength additives, or certain components thereof, may also be reduced, minimized, or eliminated via implementing the methods described herein. For example, in specific embodiments the strength composition is not used with chemistries involving formaldehyde, such as urea-formaldehyde (UF) or melamine-formaldehyde (MF). In other embodiments, the particular amount of UF or MF chemistries utilized is limited below a regulatory threshold. In general, the product prepared with the strength composition is substantially free from formaldehyde, i.e., where no formaldehyde-based components are used in the formation of the product. One of skill in the art will appreciate that the products prepared and described herein may comprise residual formaldehyde as an impurity or byproduct, and still be substantially free from formaldehyde as described above. Likewise, other chemistries may also be specifically avoided, or their use diminished, via utilization of the strength composition. For example, the compositions, methods, and/or products herein may be substantially free from isocyanate-based paper additives, styrene-butadiene or other latex-type paper additives, etc. In specific embodiments, the paper or paperboard product is substantially free from, alternatively is free from, latex additives.

In one aspect of the present invention, the strength composition can be added to the pulp slurry in a minimum amount of about 0.05 weight percent based on dry weight pulp, can be about 0.1 weight percent based on the dry weight of the pulp, can be about 0.2 weight percent, can be about 3 weight percent or higher and may be about 5 weight percent or higher based on dry weight pulp.

In other aspects of the invention a maximum amount of treated resin that can be added to the pulp slurry is about 3 weight percent, and can be about 1.5 weight percent. The resin composition is generally added in the form of an aqueous solution. In addition to the resin, other materials normally used in paper may be added as well. These include, for example, sizing agents, pigments, alum, brightening agents, dyes and dry strength agents, added in amounts well known in the art.

In exemplary embodiments, the method may further include addition to the furnish of various combinations of biopolymers including, but not limited to lignin, polymerized lignin, lignin polymerized with laccase, hemicellulose, polymerized hemicellulose, guar gum, cationic guar, CMC, chitin, chitosan, micro-fibrillated cellulose ("MFC"), pectin, hemp hurd, and soy protein (or any protein source which the MW of the protein is increased or chemically linked to the biopolymers listed above or pulp fibers). The method may also involve the use of market pulp that has been coated with micro-fibrillated cellulose during or prior to the drying stage of the process of producing the market pulp sheets. The micro-fibrillated cellulose and other biopolymers provide a large amount of carboxyl and hydroxyl groups that can provide hydrogen bonding to both the cellulose fibers of the furnish and the wet strength agents to further improve the network of bonding to provide improved wet and dry strength. With improved dry strength, the refining of the cellulosic fibers can be minimized to improve product softness. Additionally, due to the high surface area of MFC, the absorbency of the final absorbent structure is improved. After mixing the wet strength agents with the furnish, which may contain the additives and market pulp coated with MFC, the remaining steps of the Wet Laid process are completed to produce the absorbent structure. One of the surprising aspects of the present invention is the use of conventional dry strength additives to enhance wet strength.

As described in additional detail herein, the present invention composition of 0.05 to 1.5 percent by weight ultra-high molecular weight glyoxalated polyvinylamide adducts and high molecular weight anionic polyacrylamide complex can be used to provide greater than 10%, 20%, 30%, 40%, 50%, 60%, 70%, 80%, 90%, 99% substitution of PAE while achieving the same targeted high wet strength levels and achieving improved repulpability and recyclability.

In another exemplary embodiment, the above-mentioned methods can be further enhanced or facilitated with the use of a high shear mixing device such as a medium consistency ("MC") pump (approximately 5-20% consistency) during the stock preparation step. Further examples of this include a fiber furnish homogenizer primarily used in low consistency stock mixing (about 0.1-5% consistency).

Figure 7:
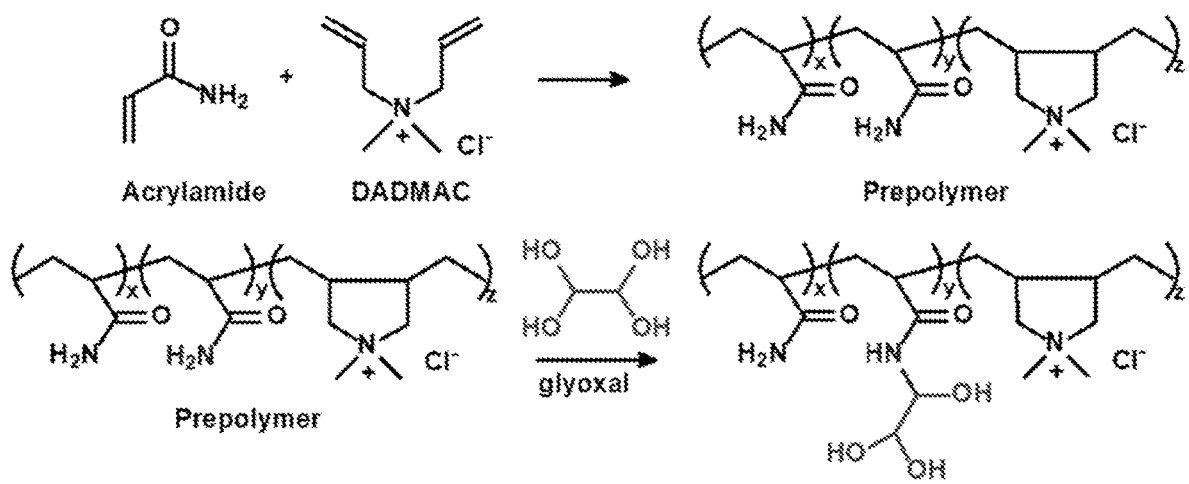
FIG. 7 shows chemical reactions resulting in a novel wet strength agent in accordance with exemplary embodiments of the present invention.

In another exemplary embodiment, rather than using UHMW GPVM, the method may include the synthesis and use of a novel wet strength agent by reacting vinylamide or CPAM polymers with glyoxal, oxidized lignin, and laccase. The reaction is believed to create a cationic polymer similar to an ultra-high molecular weight glyoxalated polyvinlyamide adduct but is more rigid and branched through the incorporation of lignin into the polymer. Polymerization of the oxidized lignin is aided by the incorporation of the enzyme laccase during the synthesis process. Polyvinylpyrrolidone (PVP), polyvinylamine (PVAm), and/or anionic polyacrylamide (APAM) can be reacted with the above polymers to enhance the rigidity of the network. FIG. 7 shows illustrative chemical reactions resulting in a novel wet strength agent in accordance with exemplary embodiments of the present invention, via the strength composition.

Figure 8:
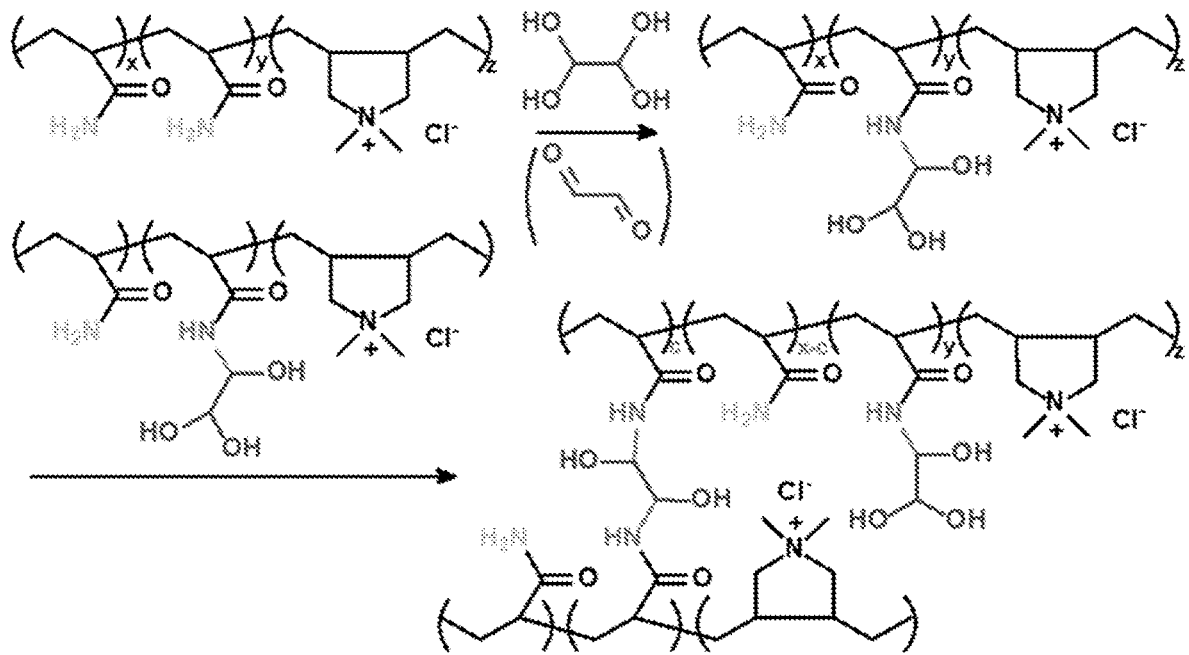
FIG. 8 shows chemical reactions resulting in a novel wet strength agent crosslinking with itself, e.g., prior to the formation of a large complex between GPAM and APAM according to an exemplary embodiment of the present invention.

When this novel wet strength agent is mixed with cellulosic fibers in the wet end of a Wet Laid process, pendant aldehydes of the wet strength agent polymers (bonded through an amidol bond to the polyvinylamide backbone), may react with the hydroxyl groups on cellulosic fibers to form hemiacetal bonds. Ionic bonds between the anionic charges on the cellulosic fiber and the cationic charges of wet strength agent polymers are also formed as are hydrogen bonds between the wet strength agent polymers and cellulosic fibers. The oxidized lignin incorporated into the wet strength agent polymers provides additional carboxyl groups to form hydrogen bonds to the hydroxyl groups on cellulosic fibers. Additionally, the pendant aldehyde groups of the wet strength agent polymers can react with the amide group of neighboring wet strength agent polymers in a crosslinking process to build a network of wet strength polymers that are also bonded to cellulosic fibers where the bonds have significant resilience to hydrolysis and thus provide wet strength. The branched structure of the wet strength agent polymers also provides improved accessibility to various cellulosic fibers. Higher molecular weight is also preferred as the size of the wet strength agent polymers are increased to further improve accessibility. Lastly, this novel polymer, which is highly branched with high molecular weight, increases the structural rigidity of the absorbent product to maintain the 3-dimensional structure, and thus absorbency, of the product when wet. FIG. 8 shows an illustrative chemical reaction demonstrating the novel wet strength agent cross-linking with itself along with the formation of a large complex between GPAM and APAM according to an exemplary embodiment of the present invention.

It will be appreciated that the term "complex" as used herein does not require a covalent bond or other specific physical interaction between the components in the strength composition (e.g. the UHMW GPVM and HMW APAM components), although in some instances such interactions may occur. In the context of the present disclosure, the components of the strength composition may be added to the stock mixture together (e.g., in a pre-mix) or separately, and in any order of addition. As will be understood in view of the examples below, the components of the strength composition may be added to the stock mixture along with any one or more other components of the strength composition, including any of those set forth herein.

In exemplary embodiments, a complex of the anionic polyacrylamide resin and an aldehyde-functionalized polymer resin possesses a net anionic charge (as tested by Mutek PCD03 test method). The amount of the GPAM/APAM complex on or in a towel or tissue product may range from about 0.25 to 1.5 percent, based on the total weight of the product.

When utilized, the polyvinylamine is not particularly limited, and will be selected by one of skill in the art in view of the disclosure herein. Examples of vinylamine containing polymers and polyvinylamine that may be utilized include those described in U.S. Pat. Nos. 9,885,155, 9,879,380, 9,783,933, 5,753,759, 10,626,558, 10,618,992, 10,047,480, 8,926,797, 8,900,412, 8,894,816, 8,778,139, 8,696,869, 8,647,470, 8,614,279, 8,604,134, 8,518,215, 8,444,818, 8,440,768, 8,404,083, 8,382,948, 8,349,134, 8,262,859, 7,972,478, 7,951,265, 7,943,713, 7,902,312, 7,034,068, 6,824,650, 6,797,785, 6,616,807, 6,576,086, 6,159,340, 5,630,907, 5,290,880, 4,818,341, 4,774,285, 4,421,602 and 2,721,140, the contents of which are incorporated herein by reference in their entirety.

In exemplary embodiments, a complex of the anionic polyacrylamide resin and an aldehyde-functionalized polymer resin possesses a net anionic charge (as tested by Mutek PCD03 test method). The amount of the GPAM/APAM complex on or in a paper or paperboard product may range from about 0.05 to 1.5 percent, based on the total weight of the product.

The paper or paperboard product is described below, and will be further understood in view of the method set forth above. In general, the paper or paperboard product prepared using the compositions of the present invention can be, for example, paper towels, bathroom tissue, facial tissue, napkins, paper straws, wipes, liquid packaging, aseptic liquid packaging, corrugated packaging, carrier packaging and molded cellulose products, etc., as well as the additional product types set forth herein.

In some embodiments, the final paper or paperboard product may comprise, 70 to 99, 80 to 99, 85 to 99 or 90 to 99 percent by weight lignocellulose fibers and 0.05 to 1.5 percent by weight ultra-high molecular weight glyoxalated polyvinylamide adducts and high molecular weight anionic polyacrylamide complex.

In some embodiments, the final paper or paperboard product may comprise, 70 to 99, 80 to 99, 85 to 99 or 90 to 99 percent by weight lignocellulose fibers and 0.05 to 1.5 percent by weight ultra-high molecular weight glyoxalated polyvinylamide adducts and high molecular weight anionic polyacrylamide complex; and from 0 to 0.5, alternatively from 0.03 to 0.5 percent by weight polyvinylamine.

The final paper or paperboard may contain other additives included in the formation of the paper or applied along with the composition. The additives applicable are those which are utilized in paper. They include but are not limited to the following: inorganic and organic fillers, such as clay or hollow sphere pigments; optical brightening agents, which are also known as fluorescent whitening aids, pigments, dyes, strength additives, sizing agents, such as rosin, AKD, ASA, and waxes and inorganic salts. Specific examples are described in various places herein, such as with respect to the method, as well as in the references incorporated herein.

The paper and paperboard made according to the processes of the present disclosure are typically recyclable, repulpable, and capable of being recycled, which are highly desired from an environmental perspective. Moreover, a synergistic effect in wet and dry strength improvement can be observed for paper and paperboard prepared using the present invention combination of an ultra-high molecular weight glyoxalated polyvinylamide adducts and high molecular weight anionic polyacrylamide complex that may additionally comprise a PAE resin. This synergistic effect was surprising and unexpected.

Repulpability may be determined using a disintegrator described in TAPPI method T205 OM-88, (1988). Using this test, it is found that paper prepared by the process of this invention can be repulped in substantially less time than is required to repulp the same paper containing conventional wet strength resin at about the same level of wet strength.

Because repulpability is dependent on wet strength (i.e., for a given resin, the higher the wet strength, the lower the repulpability), different resins should be compared at equal wet strength. Obtaining paper samples having the same wet strength levels but containing different wet strength resins is difficult, however. Thus, a method to normalize repulpability differences for wet strength differences has been developed. Since repulpability is inversely proportional to wet strength, such a "repulpability index" can be calculated as:

Repulpability Index = (wet tensile strength) × (% fiber yield)/100.

Thus a higher repulpability index value indicates better repulpability. For small differences in wet strength, this repulpability index provides a good method for determining relative differences in repulpability at equal wet strength.

Paper and paperboard with high wet strength typically is repulped with high shear energy and with strong oxidizing chemicals with chlorine containing chemicals [e.g., sodium hypochlorite (bleach)]. While non-chlorine containing chemicals (e.g., sodium persulfate, potassium persulfate, potassium peroxymonosulfate, sodium percarbonate and hydrogen peroxide) are effective, chlorine containing chemicals typically are much more cost effective. Very high shear and specialized equipment can also be used to repulp paper and paperboard with high wet strength but at a high energy and an additional capital cost.

As indicated in Tappi Method T456; complete saturation of certain types of paper, particularly paperboard, may be significantly accelerated by immersion in (a) degassed distilled water, (b) ordinary distilled water, carrying out the immersion at reduced pressure, or (c) by the addition of a wetting agent to the water. After a prolonged soaking period the pH change of the immersion water caused by the specimen and/or the slow hydrolysis of any wet-strength agent that may be present may cause a further loss of strength.

It is well-known that paper treated with glyoxalated polyacrylamide resin is more repulpable than paper treated with PAE resins at equal initial wet strength (e.g., a 10 second soak or a 5 second Finch cup test) when fully wetted. However, it has been surprisingly discovered that paper treated with ultra-high molecular weight glyoxalated polyvinylamide adducts of the present invention have improved repulpability at equal wet strength after a 2 hour soak and when fully wetted.

In one embodiment ultra-high molecular weight glyoxalated polyvinylamide adducts of the present invention have improved repulpability at equal wet strength after a 2 hour soak and when fully wetted.

With a specific repulpability method and with comparable defibering level for paper or paperboard made with the compositions of the present invention, the repulping time can decrease by greater than 10%, 20%, 30%, 40%, 50%, 60%, 70%, 80% when compared to PAE resin treated paper or paperboard at substantially equal wet strength when fully wetted at ambient pH (i.e., no additional chemicals added). Additionally, for paper or paperboard made with the compositions of the present invention, the repulping time can decrease by greater than 10%, 20%, 30%, 40%, 50%, 60%, 70%, 80% when compared to PAE resin treated paper or paperboard at substantially equal wet strength when fully wetted and when the pH is increased to pH 8, 9, 10 and 11. The pH can be increased with any basic agent, for example sodium hydroxide, potassium hydroxide, sodium carbonate, potassium carbonate, sodium bicarbonate and potassium bicarbonate.

An embodiment of the present invention is a paper or paperboard product comprising 0 to 300 ppb 3-monochloro-1,2-propanediol (a.k.a., chloropropanediol and 3-MCPD) and 0-50 ppb 1,3-dichloro-2-propanol (a.k.a., dichloropropanol and 1,3-DCP) and 0 to 0.09% by weight polyaminoamide-epihalohydrin resin to meet or exceed the requirements of the German Federal Institute for Risk Assessment (BfR) recommendations, which defines the levels of 1,3-DCP and 3-MCPD that can be extracted by water from various food contact grades of paper.

A paper or paperboard product according to an exemplary embodiment of the present invention comprises: 80 to 99 percent by weight cellulose fibers; and 0.05 to 1.5 percent by weight ultra-high molecular weight glyoxalated polyvinylamide adducts and high molecular weight anionic polyacrylamide complex. The present invention uses an ultra-high molecular weight glyoxalated polyvinylamide adducts and high molecular weight anionic polyacrylamide complex that may additionally comprise a PAE resin and a polyvinylamine containing product.

As an additional exemplary embodiment, a paper or paperboard product according to the present invention comprises: 80 to 99 percent by weight cellulose fibers; and 0.05 to 1.5 percent by weight ultra-high molecular weight glyoxalated polyvinylamide adducts and high molecular weight anionic polyacrylamide complex and a PAE wet-strength resin. The present invention uses an ultra-high molecular weight glyoxalated polyvinylamide adducts and high molecular weight anionic polyacrylamide complex that may additionally comprise a PAE resin and a polyvinylamine containing product.

As an additional exemplary embodiment, a paper or paperboard product according to the present invention comprises: 80 to 99 percent by weight cellulose fibers; and 0.05 to 1.5 percent by weight ultra-high molecular weight glyoxalated polyvinylamide adducts and high molecular weight anionic polyacrylamide complex and a polyvinylamine containing product.

A paper or paperboard product according to an exemplary embodiment of the present invention comprises: 80 to 99 percent by weight cellulose fibers; 0.05 to 1.5 percent by weight ultra-high molecular weight glyoxalated polyvinylamide adducts and high molecular weight anionic polyacrylamide complex; and 0 to 0.5, alternatively 0.03 to 0.5 percent by weight polyvinylamine.

A paper or paperboard product according to an exemplary embodiment of the present invention comprises cellulose fibers, a dichloropropanol concentration of less than 50 ppb and a chloropropanediol concentration of less than 300 ppb, and provides wet tensile strength of at least 10%, for example 15%, 20% or 25% or 30% of the value of the dry tensile strength, wherein the product contains 0 to 0.09% by weight polyaminoamide-epihalohydrin.

A paper or paperboard product according to an exemplary embodiment of the present invention comprises cellulose fibers, a dichloropropanol concentration of less than 50 ppb and a chloropropanediol concentration of less than 300 ppb, and provides wet tensile strength of at least 10%, for example 15%, 20% or 25% or 30% of the value of the dry tensile strength, wherein the product is free from polyaminoamide-epihalohydrin as measured using an "Adipate test".

Absorbent products in accordance with exemplary embodiments of the present invention have a caliper in the range of from about 600 to about 1500 microns or 700 to 1300 microns or 725 to 1200 microns or 735 to 1100 microns.

In exemplary embodiments, the CD wet strength of the absorbent product is in the range of from about 75 to about 200 n/m or 80 to 150 n/m or 85 to 145 n/m.

In exemplary embodiments, the wet caliper range of the absorbent product is from about 400 to about 800 microns or 450 to 650 microns or 470 to 575 microns.

In exemplary embodiments, the basis weight of the absorbent product is from about 35 to about 65 gsm or 38 to 52 gsm or 38 to 50 gsm or 39 to 42 gsm.

In exemplary embodiments, the CD dry strength of the absorbent product is from about 275 to about 600 N/m or 325 to 525 N/m or 375 to 485 N/m or 380 to 450 N/m.

In exemplary embodiments, absorbency of the absorbent product determined in accordance with the GATS method is from about 11 to about 18 g/g or 12.5 to 16.0 g/g or 13.5 to 15.5 g/g.

Absorbent products in accordance with exemplary embodiments of the present invention contain from about 95% to about 99% or from about 97% to about 99% by weight cellulosic fibers; from about 0.2% to about 1.5% or from about 0.05% to about 1.5% by weight high molecular weight anionic polyacrylamide; and from about 0.2% to about 0.8% or from about 0.05% to about 0.5% by weight ultra-high molecular weight glyoxalated polyvinylamide adducts. In one embodiment, the GPAM has a cationic charge density of 0.6 meq/g or less (as tested by Mutek PCD03 method). In exemplary embodiments, the absorbent products contain a biopolymer in place of or combined with the high molecular weight anionic polyacrylamide.

The absorbent products in accordance with exemplary embodiments of the present invention are substantially free of CPD, DCP and PAE. As used herein, the term "substantially free" is intended to mean that the paper contains: less than 550 parts per billion ("ppb") or from about 50 to about 550 ppb CPD; or less than about 200 ppb or from about 30 to about 200 ppb DCP, or from about 5 to 50 ppb DCP in the paper, and less than about 0.06% by weight PAE in the paper or no PAE resin added to the wet-end of the paper machine. PAE in the paper can be between 0.00 to 0.09% or between 0.00 to 0.03% or between 0.01 to 0.04% by weight. While the invention can be achieved by adding 2.5 kg/ton of PAE resin in the wet-end of the paper machine, the paper has the very low PAE or CPD/DCP described above while obtaining high wet strength, high bulk and absorbency.

In exemplary embodiments, the absorbent structure is a two-ply towel roll good sold as a retail towel.

The absorbent products in accordance with exemplary embodiments of the present invention have a wet cross direction tensile strength of 75 N/m to 200 N/m, preferably 80 to 150 N/m, and most preferably 85 to 145 N/m.

Absorbent structures prepared by the method in accordance with exemplary embodiments of the present invention include, but are not limited to, disposable paper towel, napkin, and facial products. Multiple plies of the absorbent structure can be plied together using any of the aforementioned lamination techniques to improve overall absorbency or softness.

Figure 6:
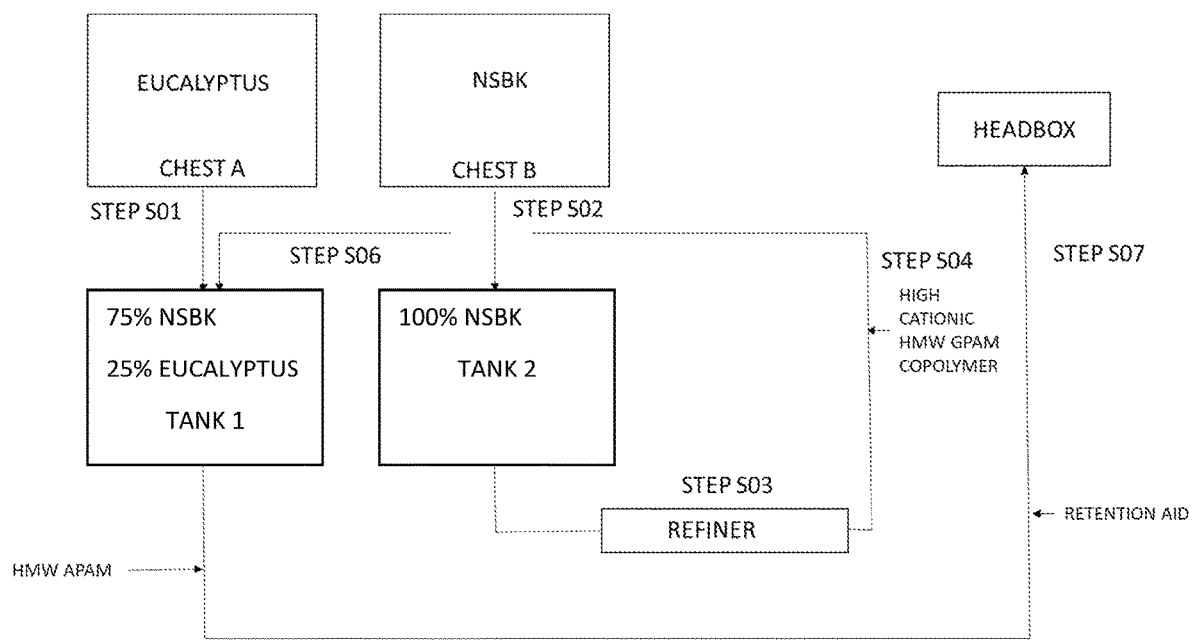
FIG. 6 is a flowchart showing a method of making an absorbent structure in accordance with an exemplary embodiment of the present invention.

FIG. 6 is a flow chart showing a method of making a paper towel product according to an exemplary embodiment of the present invention. As shown, the paper towel product is made on a wet-laid asset with a three-layer headbox using a through air dried method. The towel may be made from 75% northern bleached softwood kraft and 25% eucalyptus in all three layers. As shown in Step 01, the eucalyptus is delivered from Chest A to Blend Tank 1. In Step 02, the NSBK is delivered from Chest B to Blend Tank 2 and refined separately (Step 03) before blending into the layers. Also before blending into the layers, in Step 04, the NSBK is mixed with GPVM adducts (e.g. a HMW GPAM copolymer sold as Hercobond™ Plus 555 dry-strength additive, purchased from Solenis 2475 Pinnacle Drive, Wilmington, DE 19803 USA Tel: +1-866-337-1533). At Step S06, the NSBK mixed with the GPVM adduct is added to Blend Tank 2 to achieve a mixture of 75% NSBK and 25% eucalyptus. In Step S07, the mixture is delivered to the headbox while a HMW APAM (e.g., Hercobond™ 2800 dry-strength additive, purchased from Solenis) and a polyvinylamine retention aid (e.g., Hercobond™ 6950 dry-strength additive from Solenis) is added to the mixture.

Test Methods

All testing is conducted on prepared samples that have been conditioned for a minimum of 2 hours in a conditioned room at a temperature of 23+/−1.0 deg Celsius, and 50.0%+/−2.0% Relative Humidity. The exception is softness testing which requires 24 hours of conditioning at 23+/−1.0 deg Celsius, and 50.0%+/−2.0% Relative Humidity.

Ball Burst Testing

The Ball Burst of a 2-ply tissue or towel web was determined using a Tissue Softness Analyzer (TSA), available from emtec Electronic GmbH of Leipzig, Germany using a ball burst head and holder. The instrument is calibrated every year by an outside vendor according to the instrument manual. The balance on the TSA was verified and/or calibrated before burst analysis. The balance was zeroed once the burst adapter and testing ball (16 mm diameter) were attached to the TSA. The testing distance from the testing ball to the sample was calibrated. A 112.8 mm diameter circular punch was used to cut out five round samples from the web. One of the samples was loaded into the TSA, with the embossed surface facing up, over the holder and held into place using the ring. The ball burst algorithm "Berst Resistance" was selected from the list of available softness testing algorithms displayed by the TSA. The ball burst head was then pushed by the TSA through the sample until the web ruptured and the force in Newtons required for the rupture to occur was calculated. The test process was repeated for the remaining samples and the results for all the samples were averaged and then converted to grams force.

For more detailed description for operating the TSA, measuring ball burst, and calibration instructions refer to the "Leaflet Collection" or "Operating Instructions" manuals provided by Emtec.

Wet Ball Burst Testing

The Wet Ball Burst of a 2-ply tissue or towel web was determined using a Tissue Softness Analyzer (TSA), available from Emtec Electronic GmbH of Leipzig, Germany using a ball burst head and holder. The instrument is calibrated every year by an outside vendor according to the instrument manual. The balance on the TSA was verified and/or calibrated before burst analysis. The balance was zeroed once the burst adapter and testing ball (16 mm diameter) were attached to the TSA. The testing distance from the testing ball to the sample was calibrated. A 112.8 mm diameter circular punch was used to cut out five round samples from the web. One of the samples was loaded into the TSA, with the embossed surface facing up, over the holder and held into place using the ring. The ball burst algorithm "Berst Resistance" was selected from the list of available softness testing algorithms displayed by the TSA. One milliliter of water was placed onto the center of the sample using a pipette and 30 seconds were allowed to pass before beginning the measurement. The ball burst head was then pushed by the TSA through the sample until the web ruptured and the force in Newtons required for the rupture to occur was calculated. The test process was repeated for the remaining samples and the results for all the samples were averaged and then converted to grams force.

For more detailed description for operating the TSA, measuring ball burst, and calibration instructions refer to the "Leaflet Collection" or "Operating Instructions" manuals provided by Emtec Stretch & Md, Cd, and Wet Cd Tensile Strength Testing A Thwing-Albert EJA series tensile tester, manufactured by Thwing Albert of West Berlin, NJ, an Instron 3343 tensile tester, manufactured by Instron of Norwood, MA, or other suitable vertical elongation tensile testers, which may be configured in various ways, typically using 1 inch or 3 inch wide strips of tissue or towel can be utilized to measure stretch and MD, CD and wet CD tensile strength. The instrument is calibrated every year by an outside vendor according to the instrument manual. Jaw separation speed and distance between jaws (clamps) is verified prior to use, and the balance "zero'ed". A pretension or slack correction of 5 N/m must be met before elongation begins to be measured. After calibration, 6 strips of 2-ply product, are cut using a 25.4 mm×120 mm die. When testing MD (Machine Direction) tensile strength, the strips were cut in the MD direction. When testing CD (Cross Machine Direction) tensile strength, the strips were cut in the CD direction. One of the sample strips was placed in between the upper jaw faces and clamped before carefully straightening (without straining the sample) and clamping the sample (hanging feely from the upper jaw) between the lower jaw faces with a gap or initial test span of 5.08 cm (2 inches). Using a jaw separation speed of 2 in/min, a test was run on the sample strip to obtain tensile strength and peak stretch (as defined by TAPPI T-581 om-17). The test procedure was repeated until all the samples were tested. The values obtained for the six sample strips were averaged to determine the tensile strength and peak stretch in the MD and CD direction. When testing CD wet tensile, the strips were placed in an oven at 105 degrees Celsius for 5 minutes and saturated with 75 microliters of deionized water at the center of the strip across the entire cross direction immediately prior to pulling the sample.

Basis Weight

Using a dye and press, six 76.2 mm by 76.2 mm square samples were cut from a 2-ply product being careful to avoid any web perforations. The samples were placed in an oven at 105 deg C. for a minimum of 3 minutes before being immediately weighed on an analytical balance to the fourth decimal point. The weight of the sample in grams was multiplied by 172.223 to determine the basis weight in grams/m2. The samples were tested individually, and the results were averaged. The balance should be verified before use and calibrated every year by an outside vendor according to the instrument manual.

Caliper Testing

A Thwing-Albert ProGage 100 Thickness Tester Model 89-2012, manufactured by Thwing Albert of West Berlin, NJ was used for the caliper test. The instrument is verified before use and calibrated every year by an outside vendor according the instrument manual. The Thickness Tester was used with a 2 inch diameter pressure foot with a preset loading of 95 grams/square inch, a 0.030 inch/sec measuring speed, a dwell time of 3 seconds, and a dead weight of 298.45 g. Six 100 mm×100 mm square samples were cut from a 2-ply product with the emboss pattern facing up. The samples were then tested individually, and the results were averaged to obtain a caliper result in microns.

Wet Caliper

A Thwing-Albert ProGage 100 Thickness Tester Model 89-2012, manufactured by Thwing Albert of West Berlin, NJ was used for the caliper test. The instrument is verified before use and calibrated every year by an outside vendor according the instrument manual. The Thickness Tester was used with a 2 inch diameter pressure foot with a preset loading of 95 grams/square inch, a 0.030 inch/sec measuring speed, a dwell time of 3 seconds, and a dead weight of 298.45 g. Six 100 mm×100 mm square samples were cut from a 2-ply product with the emboss pattern facing up. Each sample was placed in a container that had been filled to a three inch level with deionized water. The container was large enough where the sample could be placed on top of the water without having to fold the sample. The sample sat in the water in the container for 30 seconds, before being removed and then tested for caliper using the ProGage. The samples were tested individually, and the results were averaged to obtain a wet caliper result in microns.

Softness Testing

Softness of a 2-ply tissue or towel web was determined using a Tissue Softness Analyzer (TSA), available from Emtec Electronic GmbH of Leipzig, Germany. The TSA comprises a rotor with vertical blades which rotate on the test piece to apply a defined contact pressure. Contact between the vertical blades and the test piece creates vibrations which are sensed by a vibration sensor. The sensor then transmits a signal to a PC for processing and display. The frequency analysis in the range of approximately 200 to 1000 Hz represents the surface smoothness or texture of the test piece and is referred to as the TS750 value. A further peak in the frequency range between 6 and 7 kHz represents the bulk softness of the test piece and is referred to as the TS7 value. Both TS7 and TS750 values are expressed as dB V2 rms. The stiffness of the sample is also calculated as the device measures deformation of the sample under a defined load. The stiffness value (D) is expressed as mm/N. The device also calculates a Hand Feel (HF) number with the value corresponding to a softness as perceived when someone touches a sample by hand (the higher the HF number, the higher the softness). The HF number is a combination of the TS750, TS7, and stiffness of the sample measured by the TSA and calculated using an algorithm which also requires the caliper and basis weight of the sample. Different algorithms can be selected for different facial, toilet, and towel paper products. Before testing, a calibration check should be performed using "TSA Leaflet Collection No. 9" available from emtec. If the calibration check demonstrates a calibration is necessary, "TSA Leaflet Collection No. 10" is followed.

A 112.8 mm diameter round punch was used to cut out five samples from the web. One of the samples was loaded into the TSA, clamped into place (outward facing or embossed ply facing upward), and the TPII algorithm was selected from the list of available softness testing algorithms displayed by the TSA when testing bath tissue and the Facial II algorithm was selected when testing towel. After inputting parameters for the sample (including caliper and basis weight), the TSA measurement program was run. The test process was repeated for the remaining samples and the results for all the samples were averaged and the average HF number recorded.

For more detailed description for operating the TSA, measuring softness, and calibrations refer to the "Leaflet Collection" or "Operating Instructions" manuals provided by Emtec.

Absorbency Testing

An M/K GATS (Gravimetric Absorption Testing System), manufactured by M/K Systems, Inc., of Peabody, MA, USA was used to test absorbency using MK Systems GATS Manual from Jun. 29, 2020. The instrument is calibrated annually by an outside vendor according to the manual. Absorbency is reported as grams of water absorbed per gram of absorbent product. The following steps were followed during the absorbency testing procedure:

Turn on the computer and the GATS machine. The main power switch for the GATS is located on the left side of the front of the machine and a red light will be illuminated when power is on. Ensure the balance is on. A balance should not be used to measure masses for a least 15 minutes from the time it is turned on. Open the computer program by clicking on the "MK GATS" icon and click "Connect" once the program has loaded. If there are connectivity issues, make sure that the ports for the GATS and balance are correct. These can be seen in Full Operational Mode. The upper reservoir of the GATS needs to be filled with Deionized water. The Velmex slide level for the wetting stage was set at 6.5 cm. If the slide is not at the proper level, movement of it can only be accomplished in Full Operational Mode. Click the "Direct Mode" check box located in the top left of the screen to take the system out of Direct Mode and put into Full Operational Mode. The level of the wetting stage is adjusted in the third window down on the left side of the software screen. To move the slide up or down 1 cm at a time, the button for "1 cm up" and "1 cm down" can be used. If a millimeter adjustment is needed, press and hold the shift key while toggling the "1 cm up" or "1 cm down" icons. This will move the wetting stage 1 mm at a time. Click the "Test Options" Icon and ensure the following set-points are inputted: "Dip Start" selected with 10.0 mm inputted under "Absorption", "Total Weight change (g)" selected with 0.1 inputted under "Start At", Rate (g) selected with 0.05 inputted per (sec) 5 under "End At" on the left hand side of the screen, "Number of Raises" 1 inputted and regular raises (mm) 10 inputted under "Desorption", Rate (g) selected with −0.03 inputted per 5 sec under "End At" on the right hand side of the screen. The water level in the primary reservoir needs to be filled to the operational level before any series of testing. This involves the reservoir and water contained in it to be set to 580 grams total mass. Click on the "Setup" icon in the box located in the top left of the screen. The reservoir will need to be lifted to allow the balance to tare or zero itself. The feed and draw tubes for the system are located on the side and extend into the reservoir. Prior to lifting the reservoir, ensure that the top hatch on the balance is open to keep from damaging the top of the balance or the elevated platform that the sample is weighed on. Open the side door of the balance to lift the reservoir. Once the balance reading is stable a message will appear to place the reservoir again. Ensure that the reservoir does not make contact with the walls of the balance. Close the side door of the balance. The reservoir will need to be filled to obtain the mass of 580 g. Once the reservoir is full, the system will be ready for testing. Obtain a minimum number of four 112.8 mm diameter circular samples. Three will be tested with one extra available. Enter the pertinent sample information in the "Enter Material I.D." section of the software. The software will automatically date and number the samples as completed with any user entered data in the center of the file name. Click the "Run Test" icon. The balance will automatically zero itself. Place the pre-cut sample on the elevated platform, making sure the sample is not in contact with the balance lid. Once the balance load is stabilized, click "Weigh". Move the sample to the aluminum test plate on the wetting stage, centered with the emboss facing down. Ensure the sample does not touch the sides and place the cover on the sample. Click "Wet the Sample". The wetting stage will drop the preset distance to initiate absorption (10 mm). The absorption will end when the rate of absorption is less than 0.05 grams/5 seconds. When absorption stops, the wetting stage will rise to conduct desorption. Data for desorption is not recorded for tested sample. Remove the saturated sample and dry the wetting stage prior to the next test. Once the test is complete, the system will automatically refill the reservoir. Record the data generated for this sample. The data that is traced for each sample is the dry weight of the sample (in grams), the normalized total absorption of the sample reflected in grams of water/gram of product, and the normalized absorption rate in grams of water per second. Repeat procedure for the three samples and report the average total absorbency.

Wet Scrub

A wet scrubbing test was used to measure the durability of a wet towel. The test involved scrubbing a sample wet towel with an abrasion tester and recording the number of revolutions of the tester it takes to break the sample. Multiple samples of the same product were tested and an average durability for that product was determined. The measured durability was then compared with similar durability measurements for other wet towel samples.

An abrasion tester was used for the wet scrubbing test. The particular abrasion tester that was used was an M235 Martindale Abrasion and Pilling Tester ("M235 tester") from SDL Atlas Textile Testing Solutions. The M235 tester provides multiple abrading tables on which the samples are abrasion tested and specimen holders that abrade the towel samples to enable multiple towel samples to be simultaneously tested. A motion plate is positioned above the abrading tables and moves the specimen holders proximate the abrasion tables to make the abrasions.

Figure 5:
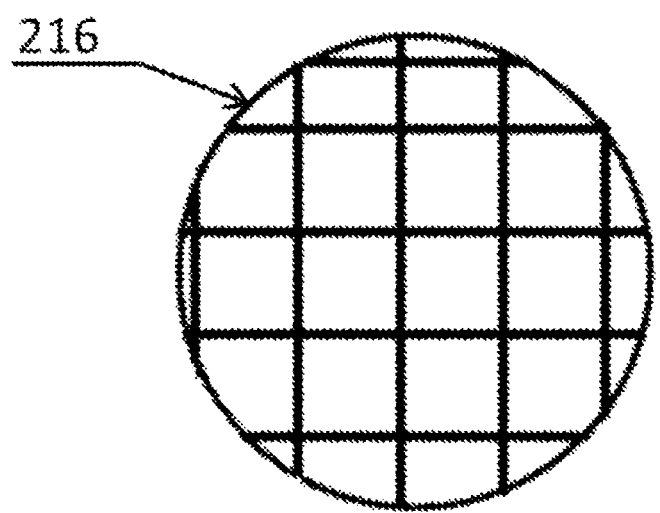
FIG. 5 is a top view of a textured polymer film used in a wet scrub test.

In preparation for the test, eight (8) towel samples, approximately 140 mm (about 5.51 inches) in diameter, were cut. Additionally, four (4) pieces, also approximately 140 mm (approximately 5.51 inches) in diameter, were cut from an approximately 82±1 μm thick nontextured polymer film. The non-textured side of a Ziploc® Vacuum Sealer bag from Johnson & Johnson was used as the non-textured polymer film. However, any non-textured polymer film, such as high density polyethylene (HDPE), low density polyethylene (LDPE), polypropylene (PP), or polyester, to name a few, could be used. Additionally, four (4) 38 mm diameter circular pieces were cut from a textured polymer film with protruding passages on the surface to provide roughness. The textured polymer film that is used for this test is the textured side of a Ziploc® Vacuum Sealer bag from SC Johnson. The textured film has a square-shaped pattern (FIG. 5). The thickness of the protruding passages of the textured polymer film that are used are approximately 213±5 μm and the thickness of the film in the valley region of the textured film between the protruding passages are approximately 131±5 μm. The samples were cut using respective 140 mm diameter and 38 mm cutting dies and a clicker press.

Figure 3:
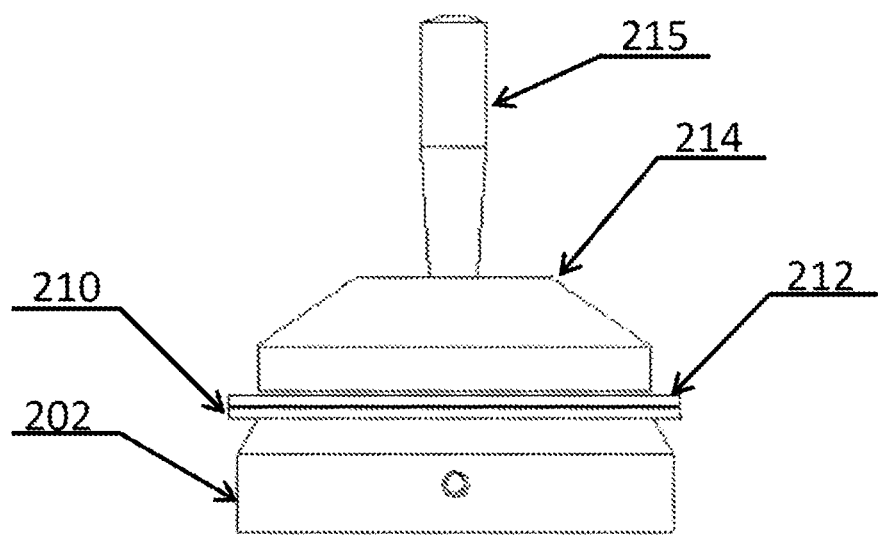
FIG. 3 show equipment used during a wet scrub test.
Figure 2:
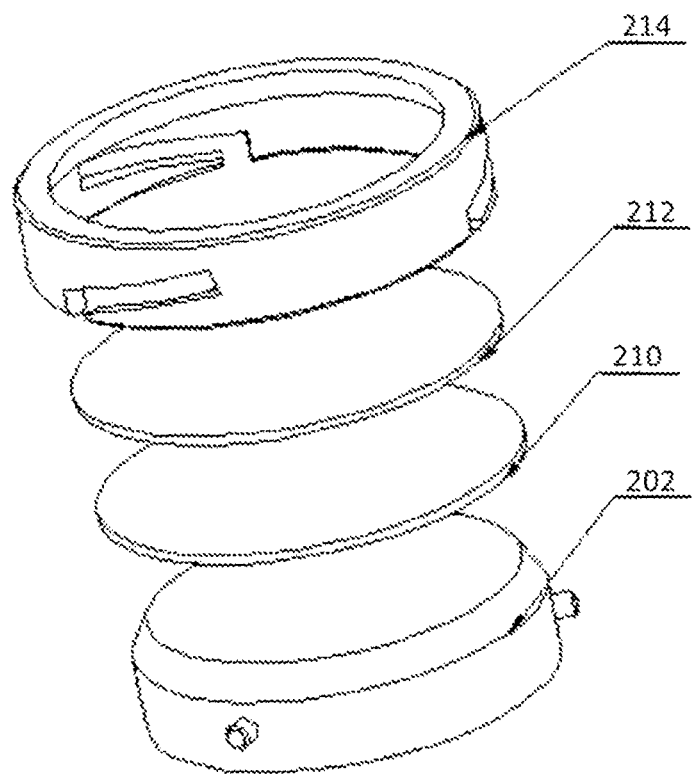
FIG. 2 is an exploded view of equipment used during a wet scrub test.

An example of an abrading table used in conjunction with the M235 tester is shown in FIG. 2. FIG. 2 presents an exploded view of the attachment of a towel sample to an abrading table 202. To insert each sample to be tested in an abrading table, the motion plate of an abrading table was removed from the tester, a clamp ring 214 was unscrewed, a piece of smooth polymer film 210 was placed on the abrading table 202, and a towel sample 212 was then placed on top of the smooth polymer film 210. A loading weight 215, shown in FIG. 3, was temporarily placed on top of the sample 212 on the abrading table 202 to hold everything in place while the clamp ring 214 was reattached to abrading table 202 to hold the towel sample 212 in place.

Figure 4:
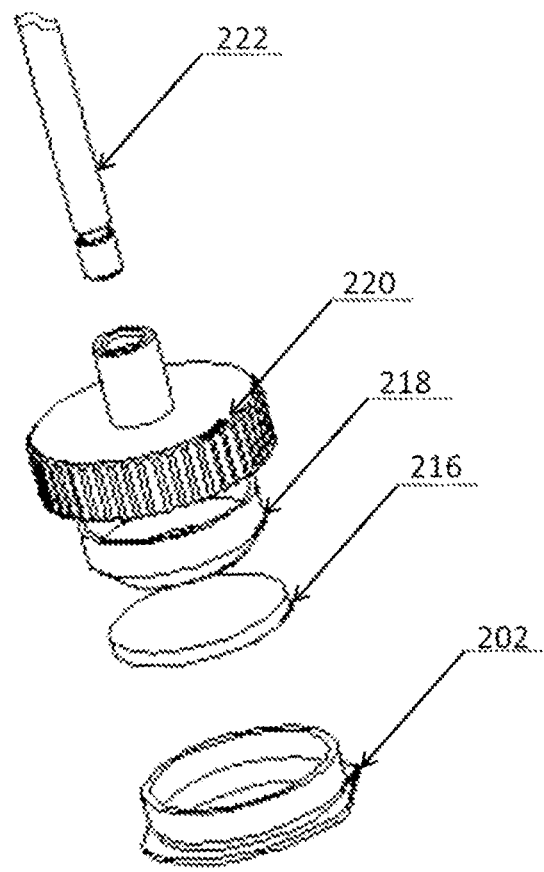
FIG. 4 is an exploded view of equipment used during a wet scrub test.

Referring to FIG. 4, for each abrading table 202 in the M235 tester, there is a corresponding specimen holder to perform the abrasion testing. The specimen holder was assembled by inserting a piece of the textured polymer film 216 within a specimen holder insert 218 that is placed beneath and held in place under a specimen holder body 220 with a specimen holder nut (not shown). A spindle 222 was mounted to the top center of the specimen holder body 220. A top view of the textured polymer film 216 of FIG. 4 is shown in FIG. 5.

The M235 tester was then turned on and set for a cycle time of 200 revolutions. 0.5 mL of water was placed on each towel sample. After a 30 second wait, the scrubbing test was initiated, thereby causing the specimen holder 206 to rotate 200 revolutions. The number of revolutions that it took to break each sample on the respective abrading table 202 (the "web scrubbing resistance" of the sample) was recorded. The results for the samples of each product were averaged and the products were then rated based on the averages.

Test Method for Charge Density Characterization of HMW APAM

Anionic polyacrylamide systems were characterized by both molecular weight and charge density. For charge density measurements, a Mutek PCD-05 particle charge detector was used. The anionic polyacrylamide samples were diluted to approximately 0.04% by weight in deionized water, then 2 mL of this solution was added to 8 mL of 0.01M phosphate buffer at pH 6 in the Mutek measuring cell. The samples were titrated with polydiallyldimethylammonium chloride ("polyDADMAC") until a streaming potential of 0 mV was measured. The reported values are based upon the dry weight of polymer.

Test Method for Molecular Weight Characterization of Hmw APAM

Anionic polyacrylamide molecular weight properties and weight average molecular weight (Mw) were determined using size exclusion chromatography (SEC) with the following conditions:
  Mobile Phase: 0.1 M sodium nitrate/20% acetonitrile
  Flow Rate: 0.8 ml/min
  Columns: 2 TSKgel GMPWxl in series
  Column Temperature: 40° C.
  DRI Detector Temperature: 40° C.
  Calibration: Relative to poly(acrylic acid) sodium salt, narrow molecular weight standards
  Sample Concentration: Typically, 2 mg/ml in mobile phase
  Sample prep: Stir in mobile phase 1-2 hours
  Filtration: 0.45 μm PVDF syringe filter Test Method for Batch Mode Mals
  Instrument: Wyatt DAWN HELEOS (18-angle light scattering detector) with flow to batch kit. The instrument was calibrated using toluene for calibration and a narrow PEG standard ~130K was used for normalization. The following parameters were used:
  Mobile Phase: 0.2M LiNO3/0.5 M acetic acid filtered through 0.22 μm filter
  Sample Concentration: 0.2 mg/mL
  dn/dc: 0.167 ml/g
  Sample Prep: The sample as received was dissolved in the mobile phase in a dust free glass vial and tumbled for one hour at room temperature and then transferred in a scratch and dust free scintillation vial that was prepared before the batch mode MALS experiment. The sample solution was analyzed without filtration. The batch mode MALS data was processed using Astra 7 software.

Test Method for AF4-MALS
  A PostNova asymmetrical flow field flow fractionation (AF4) system was used to perform the AF4-MALS experiment. The system was calibrated using bovine serum albumin standard and all the 21 angles in the light scattering detector were normalized using a 64K narrow polystyrene sulfonate standard before the sample analysis. The GPAM sample as received was dissolved in the mobile phase in a dust free glass vial and tumbled for one hour at room temperature. The sample solution was then transferred to a 2 mL autosampler vial and analyzed without filtration using AF4-MALS.

AF4 Conditions:
  Mobile Phase: 0.2M LiNO3/0.5M acetic acid filtered through 0.22 μm filter
  Concentration: 5 mg/mL
  Injection Volume: 40 μL
  dn/dc: 0.167 ml/g
  Membrane: 10K PES
  Spacer: 350 μm AF4 Method:
  Detector Flow: 0.50 ml/min
  Slot Outlet Flow: 0.00 ml/min
  Spacer: 350 μm Focusing
  Injection Flow: 0.20 ml/min
  Injection Time: 7.00 min
  Cross Flow: 2.30 ml/min
  Transition Time: 1.00 min

| Elution Step | delta t [min] | from [ml/min] | to [ml/min] | Type | Exponent |
|---|---|---|---|---|---|
| 1 | 3.00 | 2.30 | 2.30 | constant | — |
| 2 | 5.00 | 2.30 | 1.70 | Power | 0.2 |
| 3 | 1.00 | 1.70 | 1.70 | constant | — |
| 4 | 15.00 | 1.70 | 0.05 | Power | 0.35 |
| 5 | 25.00 | 0.05 | 0.05 | constant | — |
| 6 | 17.00 | 0.05 | 0.00 | constant | — |

Rinse
  Tip Pump: 0.55 ml/min
  Focus Pump: 0.00 ml/min
  Slot Pump: 0.00 ml/min
  Time: 0.50 min
  Purge valve on Test Method for Zeta Potential Zeta potential was measured using the Wyatt Mobius. Samples were tested as received (1.970 mg/ml diluted in 0.5 M AcOH/0.2 LiNO3) and after dilution in deionized water. In deionized water, the pH was adjusted using drops of 0.1 N NaOH and 0.1 N HCL and tested at pH 3.0 and 7.0. Samples were tested in a quartz cuvette with dip cell. Specific instrument parameters used are as follows:
  Set data type collected: DLS and PALS (Simultaneous)
  Auto-attenuation enable Set DLS acquisition time (s): 1
  Set number of DLS acquisitions: 5
  Set voltage amplitude (V): 3
  Set E field freq (Hz): 10.0
  Set PALS collection period (s): 5
  Laser Mode: Normal
  Set Temp (C): 25
  ZP Model: Smoluchowski
  Laser wavelength: 532 nm Test Method for Repulpability Comparison Sample Preparation, for a target 5% slurry:

Weigh out submitted samples to determine the number of tests possible at 18 gram for each test. If 18 grams are not available, determine the lowest amount available and run everything at that weight. Cut the sample into ½ inch squares, if possible, until 18 g is reached. Calculate the amount of DI water by subtracting the sample weight from 360 grams (342 g for 5%).

Equipment Set Up

Connect temperature controller and motor controller to timer. Set temperature controller to the target temperature (125° F. for the present invention). Set motor controller to 750 rpm for adding the prepared sample. Check glass Waring blender jar (Fisher 14-509-11A) with blade assembly (Fisher 14-509-12) for leaks. Clamp blender jar in place and plug in heating mat that is wrapped around the blender jar.

Repulping

Pour in the required amount of water for repulping into the jar, put blender jar cover (Fisher 14-509-11D) in place and insert temperature probe so that the blades do not hit it, clamp in place. Turn on timer and allow water to agitate (750 rpm) and reach temperature. the cover and probe over to the side. If desired, add chemistry to improve repulpability. Measure pH. If necessary, adjust with aqueous NaOH or $H_2SO_4$ to reach desired level. Slowly add the cut sample, charging jar over at least a 5-minute period. Replace cover and probe, set motor controller to the required speed (1500 rpm for the present invention) and set timer for 15 minutes. 15 minutes and the motor has shut off, remove one teaspoon of slurry (may require 2 dips) and place in 4 oz container. Add 100 mls of DI water to slurry and stir with spoon. Pour contents onto blue glass plate. Compare to Brecht Zippel Index Chart. Record results. Stir pulp to remove any build up underneath the blades. Repeat prior four steps until 120 minutes has elapsed or slurry is completely repulped. Measure final pH.

Reporting of Results

Data is collected every 15 minutes by comparing the diluted slurry (see 3.9) to the Brecht Zippel Index Chart. These values (up to 8 for 2 hrs) are reported and the final data point collected is the end result.

Test Methods for Paper and Paperboard Comparison

Linerboard paper was made using a pilot papermaking machine. The paper pulp was a 100% recycled medium with 50 ppm hardness, 25 ppm alkalinity, 2.5% GPC D28F oxidized starch (Grain Processing Corp., Muscatine, Iowa) and 2000 uS/cm conductivity (adjusted with sodium sulfate). The system pH was 7.0 at 50° C. unless indicated otherwise, and the pulp freeness was about 325 CSF with the stock temperature at 50° C. The basis weight was 160 grams per square meter (gsm). Unless otherwise indicated, PerForm™ PC 8713 flocculant (Solenis LLC, Wilmington, Del.) was added to the wet end of the paper machine in the amount of 0.0125% of dry pulp. The additives as described in the examples were added as wet strength agents or dry strength agents to the wet end of the papermaking machine at the indicated levels, expressed as a percentage of weight of polymer active versus dry paper pulp. Ring crush, Mullen burst, Short Span Compressive Test, tensile and tear tests were used to measure the strength effects of the chemical treatments.

Paper Testing

Before conducting paper properties testing, the paper was natural aged, referring to paper conditioned according to TAPPI Method T402. All paper tested had greater than two weeks natural aging at 50%+/−2% relative humidity and at 23° C.+/−1° C.

Mullen Burst (Mullen) (TAPPI Test Method T-403)

This test was used to measure the bursting strength or puncture resistance of the paper samples. The preconditioned test sample was securely clamped between two metal rings of B. F. Perkins Model C Mullen Tester completely covering the rubber diaphragm. A clutch lever is placed in forward position to apply hydrostatic pressure, expanding a rubber diaphragm until the paper sample bursts. When the test specimen bursts, the lever is moved to reverse position and burst strength is recorded. Wet burst strength is determined in a similar manner except the samples are fully wetted for 2 hours.

Ring Crush Test (RCT) (TAPPI Test Method T-822)

This test was used to measure the compression strength of the paper samples. Lorentzen & Wettre Crush Tester is utilized to perform this test. From the treated samples, strips of 152.4 mm times 12.7 mm are cut using a die. The strip is slide into the sample holder which keeps the sample in a ring shape. The sample holder is placed on the lower platen. A load, at a constant speed of 12.5 mm/min, is applied until the sample fails and this load is recorded in lbf/6 in. Five replicates each are performed in the cross and machine direction. Final reported value is geometric mean of cross and machine direction value.

Short Span Compressive Test (STFI) was determined using TAPPI Method T826, Dry tensile strength was determined using TAPPI Method T494. Wet tensile strength was determined using TAPPI Method T456 with 10 second and 2 hour soak times.

Kymene™ 1500LV wet-strength resin is a PAE resin (available from Solenis LLC, Wilmington, DE) and is abbreviated in the table as K1500LV. Hercobond™ 1044 dry-strength additive is a HMW APAM (available from Solenis LLC, Wilmington, DE) and is abbreviated in the table as H1044. Hercobond™ Plus 555 dry-strength additive is a UHMW GPVM (available from Solenis LLC, Wilmington, DE) and is abbreviated in the table as H555. Hercobond™ 1000 dry-strength additive is a conventional GPAM (available from Solenis LLC, Wilmington, DE) and is abbreviated in the table as H1000. Hercobond™ 2000 dry-strength additive is a conventional APAM (available from Solenis LLC, Wilmington, DE) and is abbreviated in the table as H2000.

The data in the Tables below demonstrate that Kymene™ 1500LV wet-strength resin (Comparative Example 1, CE1) wet strength and dry strength performance is enhanced by the addition of Hercobond™ 1044 dry-strength additive (see Comparative Example 2, CE2). The wet strength and dry strength performance of Hercobond™ Plus 555 dry-strength additive (Example 1, Ex1) is enhanced by the addition of Hercobond™ 1044 dry-strength additive (see Example 2, Ex2).

It has been surprisingly discovered that the Example 2 has much less wet tensile loss going from a 10 second soak to a 2-hour soak relative to Example 1.

It also has been surprisingly discovered that the Example 2 has much more wet tensile and % wet tensile/dry tensile than using a conventional GPAM and a conventional APAM (see Comparative Example 3, CE3).

It also has been surprisingly discovered that the Example 2 has a much greater wet tear strength than using a conventional GPAM and a conventional APAM (see Comparative Example 3, CE3). A high wet tear strength is especially important in some paperboard grades (e.g., carrier board). Additionally, Example 2 provides enhanced dry Mullen Burst, Ring Crush and STFI compression strength relative to a conventional GPAM and a conventional APAM (see Comparative Example 3, CE3) allowing the production of improved recycled linerboard, medium and corrugated boxes, for example.

| Run | First Mixer | Dry Basis % Add | Third Mixer | Dry Basis % Add | Fourth Mixer | Dry Basis % Add |
|---|---|---|---|---|---|---|
| CE0 | Blank | 0.00 | Blank | 0.00 | Blank | 0.00 |
| CE1 | K1500LV | 0.40 | Blank | 0.00 | Blank | 0.00 |
| CE1 | K1500LV | 0.50 | Blank | 0.00 | Blank | 0.00 |
| CE1 | K1500LV | 0.60 | Blank | 0.00 | Blank | 0.00 |
| CE2 | K1500LV | 0.40 | H1044 | 0.14 | H6350 | 0.02 |
| CE2 | K1500LV | 0.50 | H1044 | 0.18 | H6350 | 0.02 |
| Ex1 | H555 | 0.40 | Blank | 0.00 | Blank | 0.00 |
| Ex1 | H555 | 0.60 | Blank | 0.00 | Blank | 0.00 |
| Ex1 | H555 | 0.80 | Blank | 0.00 | Blank | 0.00 |
| Ex2 | H555 | 0.40 | H1044 | 0.14 | H6350 | 0.02 |
| Ex2 | H555 | 0.60 | H1044 | 0.21 | H6350 | 0.02 |
| Ex2 | H555 | 0.80 | H1044 | 0.29 | H6350 | 0.02 |
| CE3 | H1000 | 0.40 | H2000 | 0.14 | H6350 | 0.02 |
| CE3 | H1000 | 0.60 | H2000 | 0.21 | H6350 | 0.02 |
| CE3 | H1000 | 0.80 | H2000 | 0.29 | H6350 | 0.02 |

| Run | Dry Tensile lb/in | Wet Tensile lb/in 10 sec soak | Wet Tensile lb/in 2 hr soak | % Wet/Dry Tensile 10 sec soak | % Wet/Dry Tensile 2 hr soak |
|---|---|---|---|---|---|
| CE0 | 37.9 | 2.05 | 1.48 | 5.4 | 3.9 |
| CE1 | 40.6 | 6.91 | 6.57 | 17.0 | 16.2 |
| CE1 | 41.6 | 7.71 | 7.41 | 18.6 | 17.8 |
| CE1 | 43.0 | 8.45 | 7.81 | 19.6 | 18.1 |
| CE2 | 44.2 | 8.64 | 8.17 | 19.6 | 18.5 |
| CE2 | 45.9 | 10.06 | 9.01 | 21.9 | 19.6 |
| Ex1 | 42.2 | 5.26 | 4.34 | 12.5 | 10.3 |
| Ex1 | 42.9 | 6.29 | 5.20 | 14.7 | 12.1 |
| Ex1 | 43.2 | 7.26 | 5.94 | 16.8 | 13.7 |
| Ex2 | 41.6 | 5.58 | 5.03 | 13.4 | 12.1 |
| Ex2 | 45.3 | 6.76 | 6.16 | 14.9 | 13.6 |
| Ex2 | 45.3 | 7.94 | 7.12 | 17.5 | 15.7 |
| CE3 | 45.1 | 4.97 | 4.30 | 11.0 | 9.5 |
| CE3 | 45.6 | 5.73 | 5.11 | 12.6 | 11.2 |
| CE3 | 45.3 | 6.62 | 5.80 | 14.6 | 12.8 |

| Run | Dry Tear grams force | Wet Tear grams force; 2 hr soak | Dry Mullen Burst; lb/sq in Felt side | Ring Crush lb/in | STFI Comp. lb/in |
|---|---|---|---|---|---|
| CE0 | 211.9 | 72.4 | 62.7 | 76.7 | 21.4 |
| CE1 | 186.3 | 153.9 | 69.2 | 80.7 | 22.7 |
| CE1 | 176.9 | 148.5 | 77.4 | 81.4 | 22.8 |
| CE1 | 190.7 | 169.0 | 77.8 | 85.5 | 23.6 |
| CE2 | 177.1 | 166.7 | 78.8 | 88.4 | 26.3 |
| CE2 | 176.7 | 167.9 | 82.2 | 91.6 | 25.6 |
| Ex1 | 186.0 | 122.2 | 67.7 | 84.2 | 24.4 |
| Ex1 | 179.5 | 140.0 | 74.3 | 86.1 | 25.0 |
| Ex1 | 182.6 | 143.4 | 75.7 | 87.6 | 24.3 |
| Ex2 | 185.3 | 137.0 | 71.3 | 84.5 | 23.1 |
| Ex2 | 175.1 | 152.1 | 77.0 | 89.6 | 25.6 |
| Ex2 | 173.1 | 162.3 | 85.3 | 91.1 | 26.6 |
| CE3 | 179.9 | 74.0 | 68.3 | 75.6 | 22.3 |
| CE3 | 182.1 | 87.3 | 67.3 | 79.2 | 23.3 |
| CE3 | 180.6 | 92.7 | 75.0 | 80.0 | 23.9 |

Test Method for Detection of PAE in the Product

PAE can be measured by the method taught in "Determination of wet-strength resin in paper by pyrolysis-gas chromatography" (Paper Properties, February 1991 Tappi Journal, pages 197-201), which is hereby incorporated by reference in its entirety. PAE was determined indirectly through measuring cyclopentanone. A vertical microfurnace pyrolyzer (Yanagimoto GP-1018) was directly attached to a gas chromatograph (Shimadzu GC 9A) equipped with a flame ionization detector and a flame thermionic detector. About 0.5 mg of roll paper good or towel was pyrolyzed under the flow of nitrogen or helium carrier gas. The pyrolysis temperature was set empirically at 500° ° C. A fused-silica capillary column (50 m×0.25 mm id, Quadrex) coated with free fatty acid phase (FFAP, 0.25 μm thick) immobilized through chemical crosslinking was used. The 50 ml/minute carrier gas flow rate at the pyrolyzer was reduced to 1 ml/minute at the capillary column by a splitter. The column temperature was initially set at 40° C. then programmed to 240° C. at a rate of 4∪ C. per minute. The pyrolysis chromatogram peaks were identified using a gas chromatograph-mass spectrometer (Shimadzu QP-1000) with an electron impact ionization source. Cyclopentanone standards were prepared and a calibration curve was generated, then roll paper good or towel samples were measured against the curve.

The product can be contaminated with PAE from the Yankee coating. To eliminate this issue, the test method above was repeated 10 times and the data with intermittently high levels of PAE was eliminated. Another method to determine if the PAE is due to surface Yankee coating contamination is to use the tape layer purity test to remove the Yankee layer from both plies of the two-ply towel, napkin or facial product. One must be careful to ensure the surface contacting of the Yankee surface is the surface removed by the tape. Some tissue product can be reverse laminated with the Yankee side placed in or the Yankee side to Yankee side laminated. After removing the Yankee layer, perform the test method above on the sample.

Alternatively, PAE testing may be performed by Intertek Polychemlab B.V., Koolwaterstofstraat 1, 6161 RA Geleen, the Netherlands.

A typical sample analysis included the following: 0.2 grams of sample material was added to 10 ml of 37% aqueous hydrochloric acid including pimelic acid (CAS 111-16-0) as an internal standard. This mixture was digested for 2 hours at 150° C. using a microwave. The resultant solution was transferred into 50 ml flasks and measured with liquid chromatography-mass spectroscopy, using adipic acid (CAS 124-04-9) and glutaric acid (CAS 110-94-1) as external standards. No internal standard correction was applied. All PAE values in this patent application are presented in weight % with adipic acid and glutaric acid values combined.

Test Method for Detection of Dcp and Cpd

DCP and CPD was measured by the ACOC Official Method 2000.01, which is hereby incorporated by reference in its entirety. A 1 mg/ml stock solution of CPD was prepared by weighing 25 mg CPD (98% isotopic purity, available through Sigma-Aldrich Company) into a 25 ml volumetric flask and diluting to volume with ethyl acetate. A 100 ug/ml intermediate standard solution of CPD was prepared by diluting 1 ml of the CPD stock solution with 9 ml of ethyl acetate. A 2 ug/ml CPD spiking solution was prepared by pipetting 2 ml of the CPD intermediate standard solution into a 100 ml volumetric flask and diluting to volume with ethyl acetate. A 1 mg/ml CPD-d5 internal standard stock solution was prepared by weighing 25 mg CPD-d5 into a 25 ml volumetric flask and diluting to volume with ethyl acetate. A 10 ug/ml CPD-d5 internal standard working solution was prepared by diluting 1 ml CPD-d5 internal standard stock solution in 100 ml ethyl acetate. CPD calibration solutions were prepared by pipetting the 100 ug/ml intermediate standard solution in aliquots of 0, 12.5, 25, 125, 250 and 500 ul into 25 ml volumetric flasks and diluting to volume with 2,2,4-trimethylpentane to obtain concentrations of 0.00. 0.05, 0.10, 0.50, 1.00 and 2.00 ug/ml CPD respectively.

A 5M sodium chloride solution was prepared by dissolving 290 g NaCl (Fisher) in 1 L water. A diethyl ether-hexane solution was prepared by mixing 100 ml diethyl ether with 900 ml hexane.

Prepared products were made by adding 10 g test portion roll bath tissue or towel (to the nearest 0.01 g) into a beaker. 100 ul internal standard working solution was added. 5M NaCl solution was added to a total weight of 40 g and blended to a homogenous mixture by crushing all small lumps using a spatula. The product was placed in an ultrasonic bath for 15 minutes. The bath was covered and the product was soaked for 12 to 15 hours. EXTRELUT™ refill pack (available through EM Science) was added to 20 g prepared product and mixed thoroughly with a spatula. The mixture was poured into a 40×2 cm id glass chromatography tube with sintered disc and tap. The tube was briefly agitated by hand to compact the contents, then topped with a 1 cm layer of sodium sulfate (Fisher) and left for 15 to 20 minutes. Nonpolar contents were eluted with 80 ml diethyl ether-hexane. Unrestricted flow was allowed except for powder soup, for which the flow was restricted to about 8 to 10 ml/min. The tap was closed when the solvent reached the sodium sulfate layer and the collected solvent was discarded. CPD was eluted with 250 ml diethyl ether at a flow rate of about 8 ml/min. 250 ml eluant was collected in a 250 ml volumetric flask. 15 g anhydrous sodium sulfate was added and the flask was left for 10 to 15 minutes.

The eluant was filtered through Whatman No. 4 filter paper into a 250 ml round bottom or pear shaped flask. The extract was concentrated to about 5 ml on a rotary evaporator at 35° C. The concentrated extract was transferred to a 10 ml volumetric flask with diethyl ether and diluted to volume with diethyl ether. A small quantity (approximately a spatula tip) anhydrous sodium sulfate was added to the flask and shaken, then left for 5 to 10 minutes. Using a 1 ml gas tight syringe, 1 ml extract was transferred to a 4 ml vial. The solution was evaporated to dryness below 30° C. under a stream of nitrogen. 1 ml 2,2,4-trimethylpentane and 0.05 ml heptafluorobutyrylimidazole were immediately added and the vial was sealed. The vial was shaken with a Vortex shaker for a few seconds and heated at 70° ° C. for 20 minutes in a block heater. The mixture was cooled to <40° C. and 1 ml distilled water was added. The mixture was shaken with a Vortex shaker for 30 seconds. The phases were allowed to separate, then shaking was repeated. The 2,2,4-trimethylpentane phase was removed to a 2 ml vial and a spatula tip of anhydrous sodium sulfate was added and shaken, then the vail was allowed to stand for 2 to 5 minutes. The solution was transferred to a new 2 ml vial for GC/MS. Parallel method blanks comprising 20 g 5M NaCl solution were run with each batch of tests.

Calibration samples were prepared by adding a set of 4 ml vials 0.1 ml of each of the calibration solutions, 10 ul CPD internal working standard and 0.9 ml 2,2,4-trimethylpentane and proceeding with the derivatization as above.

The calibration samples and product samples were analyzed on a gas chromatograph/mass spectrometer. The gas chromatograph was fitted with a split/splitless injector. The column was nonpolar, 30 m×0.25 mm, 0.25 mm film thickness (J&W Scientific) DB-5 ms, or equivalent. The suggested temperature program was initial temperature 50° ° C. for 1 min, increase temperature at 2° C./min to 90° C.; increase temperature at maximum rate to 270° C.; hold for 10 min. The operating conditions were injector temperature, 270° ° C.; transfer line temperature, 270° ° C.; carrier gas, He at 1 mL/min; and injection volume, 1.5 mL in splitless mode with 40 s splitless period. The mass spectrometer was multiple-ion monitoring or full scanning at high sensitivity. The conditions were positive electron ionization with selected ion monitoring of m/z 257 (internal standard), 453, 291, 289, 275, and 253 (CPD) or full scanning over the range 100 to 500 amu.

Areas of the 3-CPD-d5 (m/z 257) and 3-CPD (m/z 253) derivative peaks were measured. The ratio of the area of the 3-CPD (m/z 253) derivative peak to the area of the 3-CPD-d5 (m/z 257) derivative peak was calculated. A calibration graph was constructed for the standards by plotting the peak area ratio versus the weight in micrograms of the 3-CPD in each vial. The slope of the calibration line was calculated. 3-MCPD, mg/kg=$(A \times 10)/(A' \times C)$ Test portion, g where MCPD=molecular CPD; A=peak area for the 3-CPD derivative; A'=peak area for the 3-CPD-d5 derivative; and C=slope of the calibration line. The same sample and standard preparation and analysis techniques were used to analyze for DCP (which will have different retention time peak and molecular weight on the mass spectrometer).

If CPD or DCP was detected when no PAE was added to the wet end of the paper machine, it was determined if these chemicals were from the Yankee coating, by using the tape layer purity test to remove the Yankee layer from both plies of the two ply towel, napkin or facial product. One must be careful to ensure the surface contacting of the Yankee surface is the surface removed by the tape. Some tissue product can be reverse laminated with the Yankee side placed in or the Yankee side to Yankee side laminated. After removing the Yankee layer, the test method above was performed on the sample.

Commercially available samples of paper towels were measured for DCP, CDP and PAE. The results are shown in Table 1 in FIG. 9.

Test Method for Amount of Gpam/Apam Complex in Product

The following test method was used to determine the amount of GPAM/APAM complex in the final product: 1. Weigh sample and record (towel 3-4 sheets, tissue 6-7 sheets) 2. Place sample in Soxhlet Extraction Body. 3. Fill a 250 ml Flat-Bottom Boiling Flask (VWR Cat. No. 89000-330) approximately halfway with DI water. 4. Place the Soxhlet Extraction Body into the neck of the flat-bottom boiling flask. 5. Attach the assembled unit to the bottom of a hot water condenser, so the flat-bottom boiling flask is sitting on a hot plate. 6. Wrap the assembled unit in two insulating cloths. 7. Turn the hot plate on to 400° C. 8. Turn cold water to the condenser on until you see water running through the hoses attached to the condenser and water is coming out of the effluent tube in the sink. The flow should be steady, but not high. 9. Allow the extraction to run overnight. 10. The following day turn the hot plate off and remove the insulating cloths. Allow the assembled unit to cool down until able to touch. 11. Remove assembled unit from condenser. With the assembled unit still attached together, rinse the soxhlet extraction body with DI water from a DI water bottle. This is to ensure all of the water used during the extraction process flows to the flat-bottom flask. 12. Detach the soxhlet extraction body from the flat-bottom flask making sure any remnants from the extraction body are allowed to drain into the flat-bottom flask. 13. Weigh a 250 ml beaker and record its weight. Then bring to a hood. 14. Pour the contents of the flat-bottom flask into the beaker. 15. Place the beaker on the hot plate set at 150° C. to allow the water to evaporate out. 16. Once all the water is evaporated and the extract is the only thing left in the beaker, turn off the hot plate and let the beaker cool to room temperature. 17. Weigh the beaker+extract and record. 18. Subtract the beaker weight from the beaker+extract weight to determine the extract weight. Finally divide the extract weight by the original sample weight and multiply by 100 to get the % extract. (See chart below)

| Sample Wt | Beaker Wt | Beaker + Extract Wt | Extract Wt | Extract % |
|---|---|---|---|---|
| A | B | C | =C − B | =((C − B)/A) * 100 |

For the following examples, UHMW GPAM copolymers (Hercobond™ Plus 555 dry-strength additive), was produced by Solenis according to the process as described in U.S. Pat. No. 7,875,676 B2 and U.S. Pat. No. 9,879,381 B2, which are hereby incorporated by reference in their entirety, and shipped to the manufacturing location at 2% solids to prevent chemical crosslinking. Production of the UHMW GPAM on site is preferred in order to reduce shipping costs and maintain maximum chemical efficiency.

Example 3

Paper towel was made on a wet-laid asset with a three layer headbox using the through air dried method. A TAD fabric design named AJ469 supplied by Asten Johnson (4399 Corporate Road, Charleston, SC 29405 USA Tel: +1.843.747.7800) was utilized. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 75% NBSK (Peace River NBSK, purchased from Mercer, Suite 1120, 700 West Pender Street Vancouver, BC V6C 1G8 Canada) and 25% eucalyptus (Cenibra pulp purchased from Itochu International 1251 Avenue of the Americas, New York, NY 10020, Tel: +1-212-818-8244) in all three layers. UHMW GPVM adducts (Hercobond™ Plus 555 dry-strength additive, purchased from Solenis 2475 Pinnacle Drive, Wilmington, DE 19803 USA Tel: +1-866-337-1533) at 11.0 kg/metric ton (dry basis) and 3.75 kg/metric ton (dry basis) of a HMW APAM (Hercobond™ 2800 dry-strength additive, purchased from Solenis) were added to each of the three layers to generate wet strength. The NBSK was refined separately before blending into the layers using 70 kwh/metric ton on one conical refiner. The Yankee and TAD section speed was 1200 m/min running 5% slower than the forming section. The Reel section was additionally running 3% faster than the Yankee. The towel was then plied together using the DEKO method described herein using a steel emboss roll with the pattern shown in FIG. 1 and 7% polyvinyl alcohol based adhesive heated to 120 deg F. A rolled 2-ply product was produced with 156 sheets and a roll diameter of 148 mm, with each sheet having a length of 6.0 inches and a width of 11 inches. The 2-ply tissue product had the following product attributes: Basis Weight 43.3 g/m$^2$, Caliper 0.749 mm, MD tensile of 497 N/m, CD tensile of 480 N/m, a ball burst of 1105 grams force, an MD stretch of 18.5%, a CD stretch of 11.8%, a CD wet tensile of 117.2 N/m, an absorbency of 13.25 g/g, and a TSA hand-feel softness of 46.2, with a TS7 of 24.7, and a TS750 of 36.4. No PAE resin was used in this example.

Comparative Example 4

Paper towel was made on a wet-laid asset with a three layer headbox using the through air dried method. A TAD fabric design named AJ469 supplied by Asten Johnson (4399 Corporate Road, Charleston, SC 29405 USA Tel: +1.843.747.7800) was utilized. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 75% NBSK (Peace River NBSK, purchased from Mercer, Suite 1120, 700 West Pender Street Vancouver, BC V6C 1G8 Canada) and 25% eucalyptus (Cenibra pulp purchased from Itochu International 1251 Avenue of the Americas, New York, NY 10020, Tel: +1-212-818-8244) in all three layers. Polyamine polyamide-epichlorohydrin resin (Kymene™ 1500LV wet-strength resin, purchased from Solenis 2475 Pinnacle Drive, Wilmington, DE 19803 USA Tel: +1-866-337-1533) at 9.0 kg/metric ton (dry basis) and 3.75 kg/metric ton (dry basis) of a high molecular weight Anionic Polyacrylamide (Hercobond™ 2800 dry-strength additive, purchased from Solenis) were added to each of the three layers to generate wet strength. The NBSK was refined separately before blending into the layers using 70 kwh/ metric ton on one conical refiner. The Yankee and TAD section speed was 1200 m/min running 5% slower than the forming section. The Reel section was additionally running 3% faster than the Yankee. The towel was then plied together using the DEKO method described herein using a steel emboss roll with the pattern shown in FIG. 1 and 7% polyvinyl alcohol based adhesive heated to 120 deg F. A rolled 2-ply product was produced with 143 sheets and a roll diameter of 148 mm, with each sheet having a length of 6.0 inches and a width of 11 inches. The 2-ply tissue product had the following product attributes: Basis Weight 40.0 g/m$^2$, Caliper 0.808 mm, MD tensile of 334 N/m, CD tensile of 343 N/m, a ball burst of 827 grams force, an MD stretch of 18.1%, a CD stretch of 11.1%, a CD wet tensile of 99.8 N/m, an absorbency of 15.8 g/g, and a TSA hand-feel softness of 47.3, with a TS7 of 23.1, and a TS750 of 37.1. The measured concentration of CPD in the product was 900 parts per billion while the measured DCP concentration was less than 50 parts per billion. Test Method: Paragraph 64 of the LFGB, Method B 80.56-2-2002-09 by means of GCMS. The water extract was prepared according to DIN EN 645: 1994-01, 10 g of paper per 250 ml cold water. ISEGA (Zeppelinstraße 3, 63741 Aschaffenburg, Germany) was the vendor that conducted the testing. PAE content was 0.165%. No machine white water or furnish were reused or recycled.

Example 4

Paper towel was made on a wet-laid asset with a three layer headbox using the through air dried method. A TAD fabric design named AJ469 supplied by Asten Johnson (4399 Corporate Road, Charleston, SC 29405 USA Tel: +1.843.747.7800) was utilized. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 75% NBSK (Grand Prairie NBSK, purchased from International Paper, 6400 Poplar Ave, Memphis, TN 38197. Tel: 1-901-419-6500) and 25% eucalyptus (Cenibra pulp purchased from Itochu International 1251 Avenue of the Americas, New York, NY 10020, Tel: +1-212-818-8244) in all three layers. UHMW GPVM adducts (Hercobond™ Plus 555 dry-strength additive, purchased from Solenis 2475 Pinnacle Drive, Wilmington, DE 19803 USA Tel: +1-866-337-1533) at 9.0 kg/metric ton (dry basis) and 5.0 kg/metric ton (dry basis) of a HMW APAM (Hercobond™ 2800 dry-strength additive, purchased from Solenis) were added to each of the three layers to generate wet strength. Additionally, 1.5 kg/metric ton (dry basis) of a polyvinylamine retention aid (Hercobond™ 6950 dry-strength additive from Solenis) was utilized. The NBSK was refined separately before blending into the layers using 60 kwh/metric ton on one conical refiner. The Yankee and TAD section speed was 1200 m/min running 6% slower than the forming section. The Reel section was additionally running 3% faster than the Yankee. The towel was then plied together using the DEKO method described herein using a steel emboss roll with the pattern shown in FIG. 1 and 7% polyvinyl alcohol based adhesive heated to 120 deg F. A rolled 2-ply product was produced with 164 sheets and a roll diameter of 148 mm, with each sheet having a length of 6.0 inches and a width of 11 inches. The 2-ply tissue product had the following product attributes: Basis Weight 40.7 g/m2, Caliper 0.726 mm, MD tensile of 476 N/m, CD tensile of 421 N/m, a ball burst of 1055 grams force, an MD stretch of 19.5%, a CD stretch of 11.4%, a CD wet tensile of 120.9 N/m, an absorbency of 12.58 g/g, and a TSA hand-feel softness of 44.6, with a TS7 of 24.3, and a TS750 of 47.3, a wet scrub of 103 revolutions, a wet caliper of 504 microns/2 ply, and a wet ball burst of 342 gf. The measured concentration of CPD in the product was less than 50 parts per billion while the measured DCP concentration was less than 50 parts per billion, Test Method: Paragraph 64 of the LFGB, Method B 80.56-2-2002-09 by means of GCMS. The water extract was prepared by according to DIN EN 645: 1994-01, 10 g of paper per 250 ml cold water. ISEGA (Zeppelinstraße 3, 63741 Aschaffenburg, Germany) was the vendor that conducted the testing. No machine white water or furnish were reused or recycled. PAE content was 0.02%. No adipic acid PAE was found in this sample, and only a small amount of glutaric acid PAE was detected, which is known to be added to the Yankee coating.

Example 5

Paper towel was made on a wet-laid asset with a three-layer headbox using the through air dried method. A TAD fabric design named AJ469 supplied by Asten Johnson (4399 Corporate Road, Charleston, SC 29405 USA Tel: +1.843.747.7800) was utilized. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 75% NBSK (Grand Prairie NBSK, purchased from International Paper, 6400 Poplar Ave, Memphis, TN 38197. Tel: 1-901-419-6500) and 25% eucalyptus (Cenibra pulp purchased from Itochu International 1251 Avenue of the Americas, New York, NY 10020, Tel: +1-212-818-8244) in all three layers. UHMW GPVM adducts (Hercobond™ Plus 555 dry-strength additive, purchased from Solenis 2475 Pinnacle Drive, Wilmington, DE 19803 USA Tel: +1-866-337-1533) at 11.0 kg/metric ton (dry basis) and 5.0 kg/metric ton (dry basis) of a HMW APAM (Hercobond™ 2800 dry-strength additive, purchased from Solenis) were added to each of the three layers to generate wet strength. Additionally, 1.5 kg/metric ton (dry basis) of a polyvinylamine retention aid (Hercobond™ 6950 dry-strength additive from Solenis) was utilized. The NBSK was refined separately before blending into the layers using 60 kwh/metric ton on one conical refiner. The Yankee and TAD section speed was 1200 m/min running 6% slower than the forming section. The Reel section was additionally running 3% faster than the Yankee. The towel was then plied together using the DEKO method described herein using a steel emboss roll with the pattern shown in FIG. 1 and 7% polyvinyl alcohol based adhesive heated to 120 deg F. A rolled 2-ply product was produced with 162 sheets and a roll diameter of 148 mm, with each sheet having a length of 6.0 inches and a width of 11 inches. The 2-ply tissue product had the following product attributes: Basis Weight 41.6 g/m2, Caliper 0.728 mm, MD tensile of 538 N/m, CD tensile of 490 N/m, a ball burst of 1108 grams force, an MD stretch of 20.4%, a CD stretch of 12.7%, a CD wet tensile of 125.2 N/m, an absorbency of 12.58 g/g, and a TSA hand-feel softness of 42.8, with a TS7 of 25.2, and a TS750 of 54.0, a wet scrub of 114 revolutions, a wet caliper of 533 microns/2 ply, and a wet ball burst of 405 gf. No PAE resin was used in this example.

Example 6

Paper towel was made on a wet-laid asset with a three layer headbox using the through air dried method. A TAD fabric design named AJ469 supplied by Asten Johnson (4399 Corporate Road, Charleston, SC 29405 USA Tel: +1.843.747.7800) was utilized. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 75% NBSK (Grand Prairie NBSK, purchased from International Paper, 6400 Poplar Ave, Memphis, TN 38197. Tel: 1-901-419-6500) and 25% eucalyptus (Cenibra pulp purchased from Itochu International 1251 Avenue of the Americas, New York, NY 10020, Tel: +1-212-818-8244) in all three layers. UHMW GPVM adducts (Hercobond™ Plus 555 dry-strength additive, purchased from Solenis 2475 Pinnacle Drive, Wilmington, DE 19803 USA Tel: +1-866-337-1533) at 4.5 kg/metric ton (dry basis), polyamine polyamide-epichlorohydrin resin (Kymene™ 1500LV wet-strength resin, purchased from Solenis 2475 Pinnacle Drive, Wilmington, DE 19803 USA Tel: +1-866-337-1533) at 2.5 kg/metric ton (dry basis) and 5.0 kg/metric ton (dry basis) of a high molecular weight Anionic Polyacrylamide (Hercobond™ 2800 dry-strength additive, purchased from Solenis) were added to each of the three layers to generate wet strength. Additionally, 1.5 kg/metric ton (dry basis) of a polyvinylamine retention aid (Hercobond™ 6950 dry-strength additive from Solenis) was utilized. The NBSK was refined separately before blending into the layers using 60 kwh/metric ton on one conical refiner. The Yankee and TAD section speed was 1200 m/min running 6% slower than the forming section. The Reel section was additionally running 3% faster than the Yankee. The towel was then plied together using the DEKO method described herein using a steel emboss roll with the pattern shown in FIG. 1 and 7% polyvinyl alcohol based adhesive heated to 120 deg F. A rolled 2-ply product was produced with 152 sheets and a roll diameter of 148 mm, with each sheet having a length of 6.0 inches and a width of 11 inches. The 2-ply tissue product had the following product attributes: Basis Weight 40.6 g/m$^2$, Caliper 0.754 mm, MD tensile of 417 N/m, CD tensile of 412 N/m, a ball burst of 1058 grams force, an MD stretch of 18.5%, a CD stretch of 11.9%, a CD wet tensile of 112.2 N/m, an absorbency of 14.33 g/g, and a TSA hand-feel softness of 45.4, with a TS7 of 23.7, and a TS750 of 45.8, a wet scrub of 95 revolutions, a wet caliper of 534 microns/2 ply, and a wet ball burst of 334 gf. The measured concentration of CPD in the product was 500 parts per billion while the measured DCP concentration was 53 parts per billion, Test Method: Paragraph 64 of the LFGB, Method B 80.56-2-2002-09 by means of GCMS. The water extract was prepared according to DIN EN 645: 1994-01, 10 g of paper per 250 ml cold water. ISEGA (Zeppelinstraße 3, 63741 Aschaffenburg, Germany) was the vendor who conducted the testing. PAE was measured at 0.054%. Hot water extraction of the complex from two layers of the product yielded 0.036 g with an extract percentage of 0.55%. No machine white water or furnish were reused or recycled.

Comparative Example 5

Paper towel was made on a wet-laid asset with a three layer headbox using the through air dried method. A TAD fabric design named AJ469 supplied by Asten Johnson (4399 Corporate Road, Charleston, SC 29405 USA Tel: +1.843.747.7800) was utilized. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 75% NBSK (Grand Prairie NBSK, purchased from International Paper, 6400 Poplar Ave, Memphis, TN 38197. Tel: 1-901-419-6500) and 25% eucalyptus (Cenibra pulp purchased from Itochu International 1251 Avenue of the Americas, New York, NY 10020, Tel: +1-212-818-8244) in all three layers. Polyamine polyamide-epichlorohydrin resin (Kymene™ 1500LV wet-strength resin, purchased from Solenis 2475 Pinnacle Drive, Wilmington, DE 19803 USA Tel: +1-866-337-1533) at 9.0 kg/metric ton (dry basis) and 5.0 kg/metric ton (dry basis) of a HMW APAM (Hercobond™ 2800 dry-strength additive, purchased from Solenis) were added to each of the three layers to generate wet strength. Additionally, 1.5 kg/metric ton (dry basis) of a polyvinylamine retention aid (Hercobond™ 6950 dry-strength additive from Solenis) was utilized. The NBSK was refined separately before blending into the layers using 60 kwh/metric ton on one conical refiner. The Yankee and TAD section speed was 1200 m/min running 6% slower than the forming section. The Reel section was additionally running 3% faster than the Yankee. The towel was then plied together using the DEKO method described herein using a steel emboss roll with the pattern shown in FIGS. 1 and 7% polyvinyl alcohol-based adhesive heated to 120 deg F. A rolled 2-ply product was produced with 146 sheets and a roll diameter of 148 mm, with each sheet having a length of 6.0 inches and a width of 11 inches. The 2-ply tissue product had the following product attributes: Basis Weight 41.4 g/m$^2$, Caliper 0.790 mm, MD tensile of 436 N/m, CD tensile of 360 N/m, a ball burst of 1031 grams force, an MD stretch of 18.0%, a CD stretch of 11.2%, a CD wet tensile of 105.2 N/m, an absorbency of 14.1 g/g, and a TSA hand-feel softness of 49.0, with a TS7 of 22.8, and a TS750 of 42.0, a wet scrub of 95 revolutions, a wet burst of 310.7 grams force, and a wet caliper of 600 microns/2 ply. The measured concentration of CPD in the product was 2375 parts per billion while the measured DCP concentration was 190 parts per billion, Test Method: Paragraph 64 of the LFGB, Method B 80.56-2-2002-09 by means of GCMS. The water extract was prepared according to DIN EN 645: 1994-01, 10 g of paper per 250 ml cold water. ISEGA (Zeppelinstraße 3, 63741 Aschaffenburg, Germany) was the vendor that conducted the testing. No machine white water or furnish were reused or recycled.

Comparative Example 6

Paper towel was made on a wet-laid asset with a three layer headbox using the through air dried method. A TAD fabric developmental design was produced using the methods of U.S. Pat. No. 10,815,620, the contents of which are hereby incorporated by reference in their entirety. The TAD fabric was a laminated composite fabric with a web contacting layer made of extruded thermoplastic polyurethane netting with 30 elements per inch in the machine direction by 5 elements per inch in the cross direction. The machine direction elements have a width of approximately 0.26 mm and cross machine direction elements with a width of 0.6 mm. The distance between MD elements was approximately 0.60 mm and the distance between the CD elements was 5.5 mm. The overall pocket depth was equal to the thickness of the netting which was equal to 0.4 mm. The depth from the top surface of the netting to the top surface of the CD element was 0.25 mm. The supporting layer had a 0.27×0.22 mm cross-section rectangular MD yarn (or filament) at 56 yarns/inch, and a 0.35 mm thickness CD yarn at 41 yarns/inch. The weave pattern of the base layer was a 5-shed, 1 MD yarn over 4 CD yarns, then under 1 CD yarn, then repeated. The material of the base fabric yarns was 100% PET. The composite fabric had an air permeability of approximately 450 cfm. The flow to each layer of the headbox was about 33% of the total sheet. The three layers of the finished towel from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 50% NBSK (Grand Prairie NBSK, purchased from International Paper, 6400 Poplar Ave, Memphis, TN 38197. Tel: 1-901-419-6500) and 50% eucalyptus (Cenibra pulp purchased from Itochu International 1251 Avenue of the Americas, New York, NY 10020, Tel: +1-212-818-8244) in all three layers. "G3" Polyamine polyamide-epichlorohydrin resin (Kymene™ GHP20 wet-strength resin, purchased from Solenis 2475 Pinnacle Drive, Wilmington, DE 19803 USA Tel: +1-866-337-1533) at 9.0 kg/metric ton (dry basis) and 5.0 kg/metric ton (dry basis) of a HMW APAM (Hercobond™ 2800 dry-strength additive, purchased from Solenis) were added to each of the three layers to generate wet strength. Additionally, 1.5 kg/metric ton (dry basis) of a polyvinylamine retention aid (Hercobond™ 6950 dry-strength additive from Solenis) was utilized. The NBSK was refined separately before blending into the layers using 71 kwh/metric ton on one conical refiner. The BEK was refined separately before blending into the layers using 20 kwh/metric ton on one conical refiner. The Yankee and TAD section speed was 1000 m/min running 3% slower than the forming section. The Reel section was additionally running 10% slower than the Yankee. The towel was then plied together using the DEKO method described herein using a steel emboss roll with the pattern shown in FIGS. 1 and 7% polyvinyl alcohol-based adhesive heated to 120 deg F. A rolled 2-ply product was produced with 228 sheets and a roll diameter of 148 mm, with each sheet having a length of 6.0 inches and a width of 11 inches. The 2-ply tissue product had the following product attributes: Basis Weight 42 g/m², Caliper 0.508 mm, MD tensile of 407 N/m, CD tensile of 486 N/m, a ball burst of 944 grams force, an MD stretch of 20.2%, a CD stretch of 11.0%, a CD wet tensile of 129.9 N/m, an absorbency of 11.49 g/g, and a TSA hand-feel softness of 51.5, with a TS7 of 21.7 and a TS750 of 38.7, a wet scrub of 49 revolutions, a wet burst of 336.6 grams force, and a wet caliper of 455.7 microns/2 ply. The measured concentration of CPD in the product was 148 parts per billion while the measured DCP concentration was less than 50 parts per billion, Test Method: Paragraph 64 of the LFGB, Method B 80.56-2-2002-09 by means of GCMS. The water extract was prepared according to DIN EN 645: 1994-01, 10 g of paper per 250 ml cold water. ISEGA (Zeppelinstraße 3, 63741 Aschaffenburg, Germany) was the vendor that conducted the testing. The PAE percentage was 0.12 by weight. No machine white water or furnish were reused or recycled.

Comparative Example 7

Paper towel was made on a wet-laid asset with a three-layer headbox using the through air dried method. A TAD fabric design named AJ469 with a round weft (0.65 mm) supplied by Asten Johnson (4399 Corporate Road, Charleston, SC 29405 USA Tel: +1.843.747.7800) was utilized. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 70% NBSK (Grand Prairie NBSK, purchased from International Paper, 6400 Poplar Ave, Memphis, TN 38197. Tel: 1-901-419-6500) and 30% eucalyptus (Cenibra pulp purchased from Itochu International 1251 Avenue of the Americas, New York, NY 10020, Tel: +1-212-818-8244) in all three layers. Fennorez 3000 a GPAM copolymer from Kemira (Energiakatu 4 P.O. Box 330 00101 Helsinki, Finland Tel. +358 10 8611 Fax. +358 10 862 1119) at 2.0 kg/metric ton (dry basis) and 2.0 kg/metric ton (dry basis) of an APAM (Fennobond 85, purchased from Kemira) were added to each of the three layers to generate wet strength. For this Example, exemplary polymeric aldehyde-functionalized polymers can be a glyoxalated polyacrylamide, such as a cationic glyoxalated polyacrylamide or APAM as described in U.S. Pat. Nos. 3,556,932, 3,556,933, 4,605, 702, 7,828,934, and U.S. Patent Application 2008/0308242, each of which is incorporated herein by reference. Such compounds include FENNOBOND™ brand polymers from Kemira Chemicals of Helsinki, Finland. The NBSK was refined separately before blending into the layers using 60 kwh/metric ton on one conical refiner. The Yankee and TAD section speed was 1350 m/min running 12% slower than the forming section. The Reel section was additionally at the same speed as the Yankee. The towel was then plied together using the DEKO method described herein using a steel emboss roll with the pattern shown in FIGS. 1 and 7% polyvinyl alcohol-based adhesive heated to 120 deg F. A rolled 2-ply product was produced with 148 sheets and a roll diameter of 148 mm, with each sheet having a length of 6.0 inches and a width of 11 inches. The 2-ply tissue product had the following product attributes: Basis Weight 38.4 g/m², Caliper 0.778 mm, MD tensile of 280 N/m, CD tensile of 302 N/m, a ball burst of 708 grams force, an MD stretch of 14.6%, a CD stretch of 8.6%, a CD wet tensile of 57.3 N/m, an absorbency of 14.15 g/g, and a TSA hand-feel softness of 46.8, with a TS7 of 22.5, and a TS750 of 52.4, and D value of 2.4, a wet scrub of 35 revolutions, a wet caliper of 542 microns/2 ply, and a wet ball burst of 140 gf. No PAE resin was added.

Example 7

Paper towel was made on a wet-laid asset with a three layer headbox using the through air dried method. A TAD fabric design named AJ469 with a round weft (0.65 mm) was supplied by Asten Johnson (4399 Corporate Road, Charleston, SC 29405 USA Tel: +1.843.747.7800) was utilized. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 70% NBSK (Grand Prairie NBSK, purchased from International Paper, 6400 Poplar Ave, Memphis, TN 38197. Tel: 1-901-419-6500) and 30% eucalyptus (Cenibra pulp purchased from Itochu International 1251 Avenue of the Americas, New York, NY 10020, Tel: +1-212-818-8244) in all three layers. UHMW GPVM adducts (Hercobond™ Plus 555 dry-strength additive, purchased from Solenis 2475 Pinnacle Drive, Wilmington, DE 19803 USA Tel: +1-866-337-1533) at 6.3 kg/metric ton (dry basis) and 2.1 kg/metric ton (dry basis) of a HMW APAM (Hercobond™ 2800 dry-strength additive, purchased from Solenis) were added to each of the three layers to generate wet strength. Additionally, 0.3 kg/metric ton (dry basis) of a polyvinylamine retention aid (Hercobond™ 6950 dry-strength additive from Solenis) was utilized. The NBSK was refined separately before blending into the layers using 60 kwh/metric ton on one conical refiner. The Yankee and TAD section speed was 1350 m/min running 12% slower than the forming section. The Reel section was additionally running 2% slower than the Yankee. The towel was then plied together using the DEKO method described herein using a steel emboss roll with the pattern shown in FIGS. 1 and 7% polyvinyl alcohol-based adhesive heated to 120 deg F. A rolled 2-ply product was produced with 143 sheets and a roll diameter of 148 mm, with each sheet having a length of 6.0 inches and a width of 11 inches. The 2-ply tissue product had the following product attributes: Basis Weight 40.8 g/m², Caliper 0.840 mm, MD tensile of 398 N/m, CD tensile of 445 N/m, a ball burst of 1042 grams force, an MD stretch of 18.0%, a CD stretch of 9.3%, a CD wet tensile of 105 N/m, an absorbency of 15.16 g/g, and a TSA handfeel softness of 41.9, with a TS7 of 27.3, and a TS750 of 54.8, and a D value of 2.2, a wet scrub of 85 revolutions, a wet caliper of 594 microns/2 ply, and a wet ball burst of 266 gf. The measured concentration of CPD in the product was less than 50 parts per billion while the measured DCP concentration was less than 50 parts per billion, Test Method: Paragraph 64 of the LFGB, Method B 80.56-2-2002-09 by means of GCMS. The water extract was prepared according to DIN EN 645: 1994-01, 10 g of paper per 250 ml cold water. ISEGA (Zeppelinstraße 3, 63741 Aschaffenburg, Germany) was the vendor that conducted the testing. No machine white water or furnish were reused or recycled. PAE content was less than 0.02%. No adipic acid PAE was detected in this sample. Only glutaric acid PAE was detected, which is known to be added to the Yankee coating. Hot water extraction from all three layers of the product yielded 0.038 grams and 0.57% complex extracted.

Example 8

Paper towel was made on a wet-laid asset with a three layer headbox using the through air dried method. A laminated composite fabric with a polyurethane netting with an MD of 16 strands per inch by 14 strands per inch CD as described in U.S. Pat. No. 10,815,620 was utilized. The flow to each layer of the headbox was about 33% of the total sheet. The three layers of the finished tissue from top to bottom were labeled as air, core and dry. The air layer is the outer layer that is placed on the TAD fabric, the dry layer is the outer layer that is closest to the surface of the Yankee dryer and the core is the center section of the tissue. The towel was produced with 70% NBSK (Grand Prairie NBSK, purchased from International Paper, 6400 Poplar Ave, Memphis, TN 38197. Tel: 1-901-419-6500) and 30% eucalyptus (Cenibra pulp purchased from Itochu International 1251 Avenue of the Americas, New York, NY 10020, Tel: +1-212-818-8244) in all three layers. UHMW GPVM adducts (Hercobond™ Plus 555 dry-strength additive, purchased from Solenis 2475 Pinnacle Drive, Wilmington, DE 19803 USA Tel: +1-866-337-1533) at 9.0 kg/metric ton (dry basis) and 5.0 kg/metric ton (dry basis) of a HMW APAM (Hercobond™ 2800 dry-strength additive, purchased from Solenis) were added to each of the three layers to generate wet strength. Additionally, 1.5 kg/metric ton (dry basis) of a polyvinylamine retention aid (Hercobond™ 6950 dry-strength additive from Solenis) was utilized. The NBSK was refined separately before blending into the layers using 100 kwh/metric ton on one conical refiner. The Yankee and TAD section speed was 1000 m/min running 6% slower than the forming section. The Reel section was additionally running 14% slower than the Yankee. The towel was then plied together using the DEKO method described herein using a steel emboss roll with the pattern shown in FIGS. 1 and 7% polyvinyl alcohol based adhesive heated to 120 deg F. A rolled 2-ply product was produced with 134 sheets and a roll diameter of 148 mm, with each sheet having a length of 6.0 inches and a width of 11 inches. The 2-ply tissue product had the following product attributes: Basis Weight 43.2 g/m², Caliper 0.908 mm, MD tensile of 407 N/m, CD tensile of 441 N/m, a ball burst of 1149 grams force, an MD stretch of 25.4%, a CD stretch of 13.1%, a CD wet tensile of 125.6 N/m, an absorbency of 17.60 g/g, and a TSA hand-feel softness of 38.3, with a TS7 of 33.9, and a TS750 of 33.2, and a D value of 2.2, a wet scrub of 110 revolutions, a wet caliper of 610 microns/2 ply. The wet ball burst could not be measured. The measured concentration of CPD in the product was less than 50 parts per billion while the measured DCP concentration was less than 50 parts per billion, Test Method: Paragraph 64 of the LFGB, Method B 80.56-2-2002-09 by means of GCMS. The water extract was prepared according to DIN EN 645: 1994-01, 10 g of paper per 250 ml cold water. ISEGA (Zeppelinstraße 3, 63741 Aschaffenburg, Germany) was the vendor that conducted the testing. No machine white water or furnish were reused or recycled.

As is evident from the above Examples and Comparative Examples, methods in accordance with exemplary embodiments of the present invention achieve a roll retail towel with very low DCP and MCPD and ultra-premium towel properties (bulk, absorbency, MD/CD dry strength and CD wet strength) with very low doses of PAE. By way of background, G3 PAE, which is purified PAE (i.e., chlorine material is removed before use in the mill) may be used to obtain some level of wet strength. However, the purified PAE has lower reactivity and lower wet strength properties per molecule. Further, more purified PAE is needed to obtain high levels of wet strength, which is detrimental to absorbency and the environment and expensive. Overall, the use of G3 PAE results in a towel product with low strength, low absorbency, and low bulk at a higher cost.

As shown in Comparative Example 8, desirable properties for a towel product may not be achieved using an GPAM/APAM complex if the molecular weight of the GPAM/APAM complex is too low or radius of gyration (ROG) (explained further below) of the complex is not optimal. In contrast, it is believed that the use of a very large molecular weight complex in accordance with exemplary embodiments of the present invention form a "net" around the pulp fiber web, thereby holding the web together. Thus, it is preferable to produce the GPAM on the mill site, at 2% solids. In contrast, most GPAM is at >5% solids or close to 10% solids.

Without being bound by theory, an important aspect of the present invention involves the use of a high MW GPAM/APAM complex that remains anionic, as opposed to the conventional technique involving the use of a cationic complex. It is believed that the use of a GPAM/APAM complex that remains anionic creates more ionic or covalent bonds between the complex and the pulp fibers. This is counter to the conventional belief that a cationic complex is required to bond with an anionic fiber (e.g., all virgin pulp fibers). Again, without being bound by theory, it is believed that charge is not the governing factor and the amount of connections in the net is equally or more important. A cationic GPAM/APAM complex indicates that the GPAM charge over-takes the APAM. The APAM polymer is consumed and may not expand to its largest size. Using an anionic GPAM/APAM complex results in a larger anionic size, which can be expressed as the ROG of the polymer. A larger ROG will create a larger net with the same number of molecules.

The large anionic GPAM/APAM complex may not be retained at high enough levels without the PVAM retention aid. The PVAM is very highly cationic. This high charge forces the GPAM/APAM complex to bond with the pulp fibers which have an evenly spaced negative charge.

While in the foregoing specification a detailed description of specific embodiments of the invention were set forth, it will be understood that many of the details herein given may be varied considerably by those skilled in the art without departing from the spirit and scope of the invention.

The invention claimed is:

1. A paper or paperboard product, comprising:
lignocellulosic and/or cellulosic fibers;
ultra-high molecular weight glyoxalated polyvinylamide (UHMW GPVM) adducts and high molecular weight anionic polyacrylamide (HMW APAM) complex, the UHMW GPVM adducts and HMW APAM complex being present in the paper or paperboard product by an amount of at least 0.05% by weight;
a dichloropropanol concentration of less than 50 ppb;
a chloropropanediol concentration of less than 300 ppb;
from 0 to 0.09% by weight polyaminoamide-epihalohydrin; and
a wet tensile strength of at least 10% of the value of a dry tensile strength of the product,
wherein the UHMW GPVM adducts and HMW APAM complex comprises: (i) HMW APAM having a weight average molecular weight (Mw) of from greater than 500,000 to 2,000,000 daltons; (ii) UHMW GPVM having a weight average molecular weight (Mw) of from greater than 2,000,000 to about 50,000,000 daltons; or (iii) both (i) and (ii).

2. The paper or paperboard product of claim 1, wherein: (i) the product comprises from 0.25 to 1.5% by weight of the UHMW GPVM adducts and HMW APAM complex; (ii) the wet tensile strength of the product is at least 15% of the value of the dry tensile strength of the product; or (iii) both (i) and (ii).

3. The paper or paperboard product of claim 1, wherein: (i) the product is free from the polyaminoamide-epihalohydrin as measured using an "Adipate test"; (ii) the wet tensile strength of the product is at least 20% of the value of the dry tensile strength of the product; or (iii) both (i) and (ii).

4. A paper or paperboard product comprising:
from 80 to 99% by weight lignocellulosic and/or cellulosic fibers;
ultra-high molecular weight glyoxalated polyvinylamide (UHMW GPVM) adducts and high molecular weight anionic polyacrylamide (HMW APAM) complex, the UHMW GPVM adducts and HMW APAM complex being present in the paper or paperboard product by an amount of 0.05 to 1.5% by weight; and
from 0 to 0.5% by weight polyvinylamine,
wherein the UHMW GPVM adducts and HMW APAM complex comprises: (i) HMW APAM having a weight average molecular weight (Mw) of from greater than 500,000 to 2,000,000 daltons; (ii) UHMW GPVM adducts having a weight average molecular weight (Mw) of from greater than 2,000,000 to about 50,000,000 daltons; or (iii) both (i) and (ii).

5. The paper or paperboard product of claim 4, wherein: (i) the product comprises from 0.25 to 1.5% by weight of the UHMW GPVM adducts and HMW APAM complex; (ii) the wet tensile strength of the product is at least 15% of the value of the dry tensile strength of the product; or (iii) both (i) and (ii).

6. The paper or paperboard product of claim 4, wherein the UHMW GPVM adducts and HMW APAM complex comprises: (i) HMW APAM having a weight average molecular weight (Mw) of from 550,000 to 1,500,000 daltons; (ii) UHMW GPVM adducts having a weight average molecular weight (Mw) of from 8,000,000 to about 25,000,000 daltons; or (iii) both (i) and (ii).

7. The paper or paperboard product of claim 4, wherein the UHMW GPVM adducts and HMW APAM complex comprises HMW APAM having an acrylic acid to acrylamide molar ratio of from 7:93 to 40:60.

8. The paper or paperboard product of claim 4, wherein the UHMW GPVM adducts and HMW APAM complex comprises HMW APAM having an acrylic acid to acrylamide molar ratio of from 12:88 to 35:65.

9. The paper or paperboard product of claim 8, wherein the product comprises from 0.25 to 1.5% by weight of the UHMW GPVM adducts and HMW APAM complex.

10. The paper or paperboard product of claim 4, wherein the product exhibits a repulping time at least 20% less than a similar PAE resin-treated paper or paperboard product having a comparable defibering level and a substantially equal wet strength measured when fully wetted after a 2 hour aqueous soak.

11. The paper or paperboard product of claim 10, wherein the product exhibits the repulping time of at least 20% less than the similar PAE resin-treated paper or paperboard product during repulping in water at a pH equal to or greater than about 9.

12. The paper or paperboard product of claim 4, wherein the product comprises from 0.01 to 0.5% by weight of the polyvinylamine.

13. A method of making a paper or paperboard product, comprising:
forming an aqueous stock mixture comprising from 80 to 99% by weight solids lignocellulosic and/or cellulosic fibers, ultra-high molecular weight glyoxalated polyvinylamide (UHMW GPVM) adducts and high molecular weight anionic polyacrylamide (HMW APAM) complex, the UHMW GPVM adducts and HMW APAM complex being present in the stock mixture by an amount of 0.05 to 1.5% by weight solids, from 0 to 0.09% by weight solids of a polyaminoamide-epihalohydrin, and from 0 to 0.5% by weight solids of a polyvinylamine; and
sheeting and drying the aqueous stock mixture, thereby giving the product,
wherein the UHMW GPVM adducts and HMW APAM complex comprises: (i) HMW APAM having a weight average molecular weight (Mw) of from greater than 500,000 to 2,000,000 daltons; (ii) UHMW GPVM adducts having a weight average molecular weight (Mw) of from 8,000,000 to about 25,000,000 daltons; or (iii) both (i) and (ii).

14. The method of claim 13, wherein the aqueous stock mixture is formed without addition of the polyaminoamide-epihalohydrin, and wherein the product is free from the polyaminoamide-epihalohydrin as measured using an "Adipate test".

15. The method of claim 13, wherein the UHMW GPVM adducts and HMW APAM complex comprises HMW APAM having an acrylic acid to acrylamide molar ratio of from 7:93 to 40:60.

16. The method of claim 13, wherein the aqueous stock mixture is formed with 0.01 to 0.5% by weight solids of the polyvinylamine.

17. The method of claim 13, wherein the paper or paperboard product comprises: (i) a dichloropropanol concentration of less than 50 ppb and a chloropropanediol concentration of less than 300 ppb; a wet tensile strength at least 15% of the value of the dry tensile strength of the paper or paperboard product; or (iii) both (i) and (ii).

* * * * *